(12) United States Patent
Noguchi et al.

(10) Patent No.: US 8,405,852 B2
(45) Date of Patent: Mar. 26, 2013

(54) IMAGE FORMING SYSTEM USING A MANAGEMENT APPARATUS TO MANAGE SOFTWARE COMPONENTS

(75) Inventors: Yuusuke Noguchi, Kanagawa (JP); Akeo Maruyama, Tokyo (JP); Tetsuo Ohtsuka, Saitama (JP); Yoshiya Itoh, Kanagawa (JP); Michio Sumiyoshi, Osaka (JP); Shinichi Kudo, Kanagawa (JP); Kazunori Kobayashi, Tokyo (JP); Tomohiro Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 640 days.

(21) Appl. No.: 12/365,208

(22) Filed: Feb. 4, 2009

(65) Prior Publication Data

US 2009/0201547 A1    Aug. 13, 2009

(30) Foreign Application Priority Data

Feb. 12, 2008  (JP) ................................ 2008-030931

(51) Int. Cl.
*G06F 15/00*  (2006.01)
(52) U.S. Cl. .......... 358/1.15; 358/1.1; 358/1.16; 710/11
(58) Field of Classification Search .................. None
See application file for complete search history.

(56) References Cited

U.S. PATENT DOCUMENTS

| | | | |
|---|---|---|---|
| 6,330,611 B1 | 12/2001 | Itoh et al. | |
| 6,415,351 B1 | 7/2002 | Kobayashi et al. | |
| 6,513,113 B1 | 1/2003 | Kobayashi | |
| 6,757,070 B1 * | 6/2004 | Lin et al. ........................ | 358/1.1 |
| 6,792,223 B2 | 9/2004 | Kobayashi | |
| 7,221,468 B2 | 5/2007 | Kobayashi | |
| 7,461,255 B2 * | 12/2008 | Iwamura ........................ | 713/176 |
| 7,903,267 B2 * | 3/2011 | Yasui et al. .................... | 358/1.13 |
| 2002/0097431 A1 * | 7/2002 | Ikegami ......................... | 358/1.15 |
| 2002/0140971 A1 * | 10/2002 | Machida ........................ | 358/1.15 |
| 2003/0053129 A1 * | 3/2003 | Morooka et al. .............. | 358/1.15 |
| 2005/0052677 A1 | 3/2005 | Maruyama | |
| 2005/0057774 A1 | 3/2005 | Maruyama | |

(Continued)

FOREIGN PATENT DOCUMENTS

| | | |
|---|---|---|
| JP | 11-110161 | 4/1999 |
| JP | 11-249847 | 9/1999 |

(Continued)

OTHER PUBLICATIONS

Japanese Office Action dated Feb. 28, 2012.

*Primary Examiner* — Twyler Haskins
*Assistant Examiner* — Helen Q Zong
(74) *Attorney, Agent, or Firm* — IPUSA, PLLC

(57) ABSTRACT

An image forming system includes a plurality of image forming apparatuses, a management apparatus configured to manage and operate the image forming system, and a plurality of communication control apparatuses each configured to control data communication between the management apparatus and a corresponding image forming apparatus, wherein the management apparatus includes a software component storing unit configured to store one or more software components in a predetermined storage area of a storage device of the management apparatus, the one or more software components being each configured to generate print data recognizable by a corresponding image forming apparatus and a selecting unit configured to select a software component from the one or more software components in response to the print request, the selected software component being used to generate print data corresponding to the image forming apparatus selected as a printing apparatus.

15 Claims, 21 Drawing Sheets

U.S. PATENT DOCUMENTS

| | | |
|---|---|---|
| 2006/0215219 A1 | 9/2006 | Yorimoto et al. |
| 2007/0206217 A1 | 9/2007 | Maruyama |
| 2007/0229891 A1* | 10/2007 | Yanagi et al. ............... 358/1.15 |
| 2007/0299989 A1 | 12/2007 | Maruyama |
| 2008/0034127 A1* | 2/2008 | Nishio ........................... 710/11 |
| 2008/0259397 A1* | 10/2008 | Uehara ....................... 358/1.15 |

FOREIGN PATENT DOCUMENTS

| | | |
|---|---|---|
| JP | 2001-249785 | 9/2001 |
| JP | 2003-280842 | 10/2003 |
| JP | 2006-134245 | 5/2006 |
| JP | 2006-155288 | 6/2006 |
| JP | 2006-270385 | 10/2006 |

\* cited by examiner

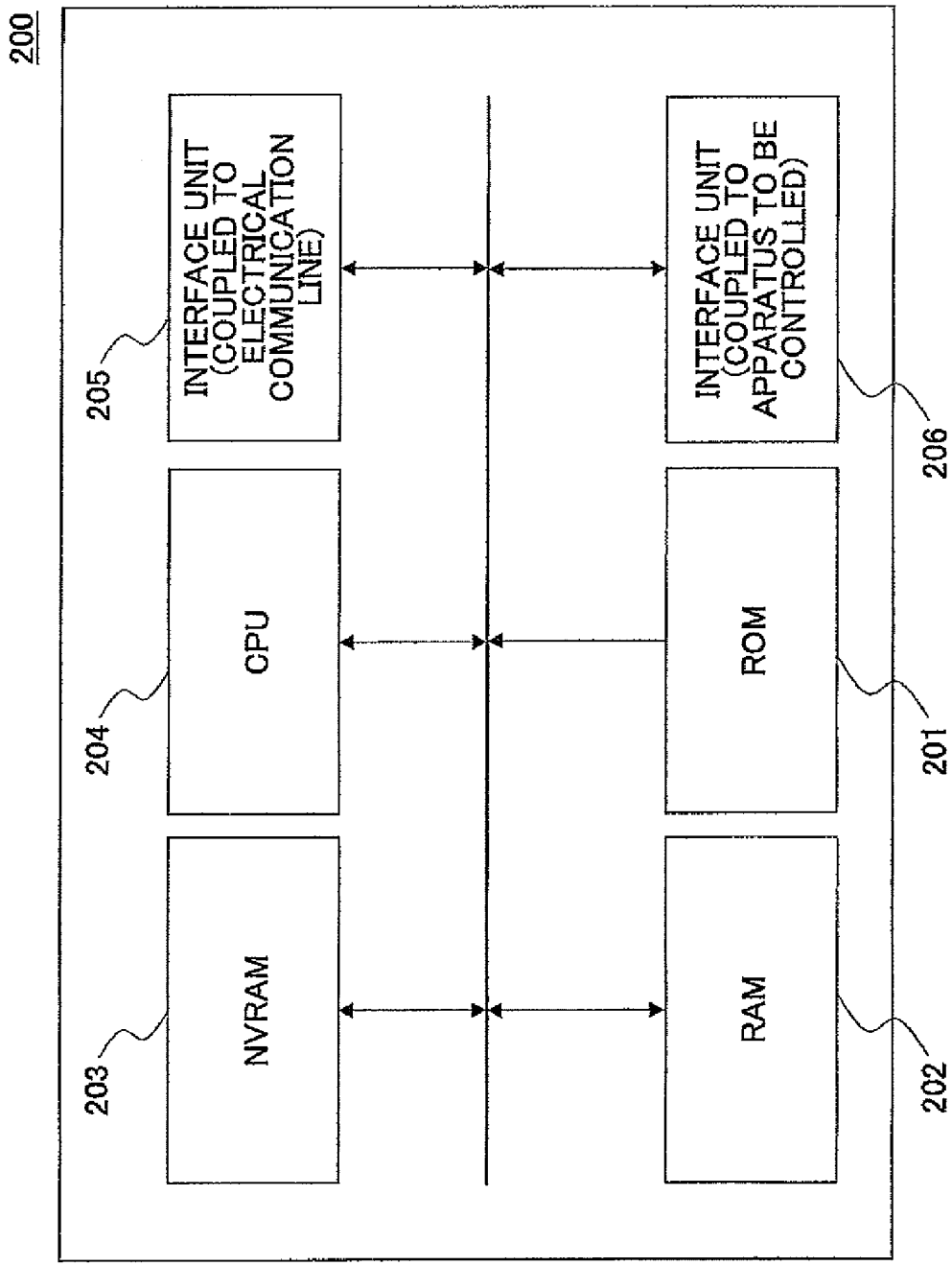

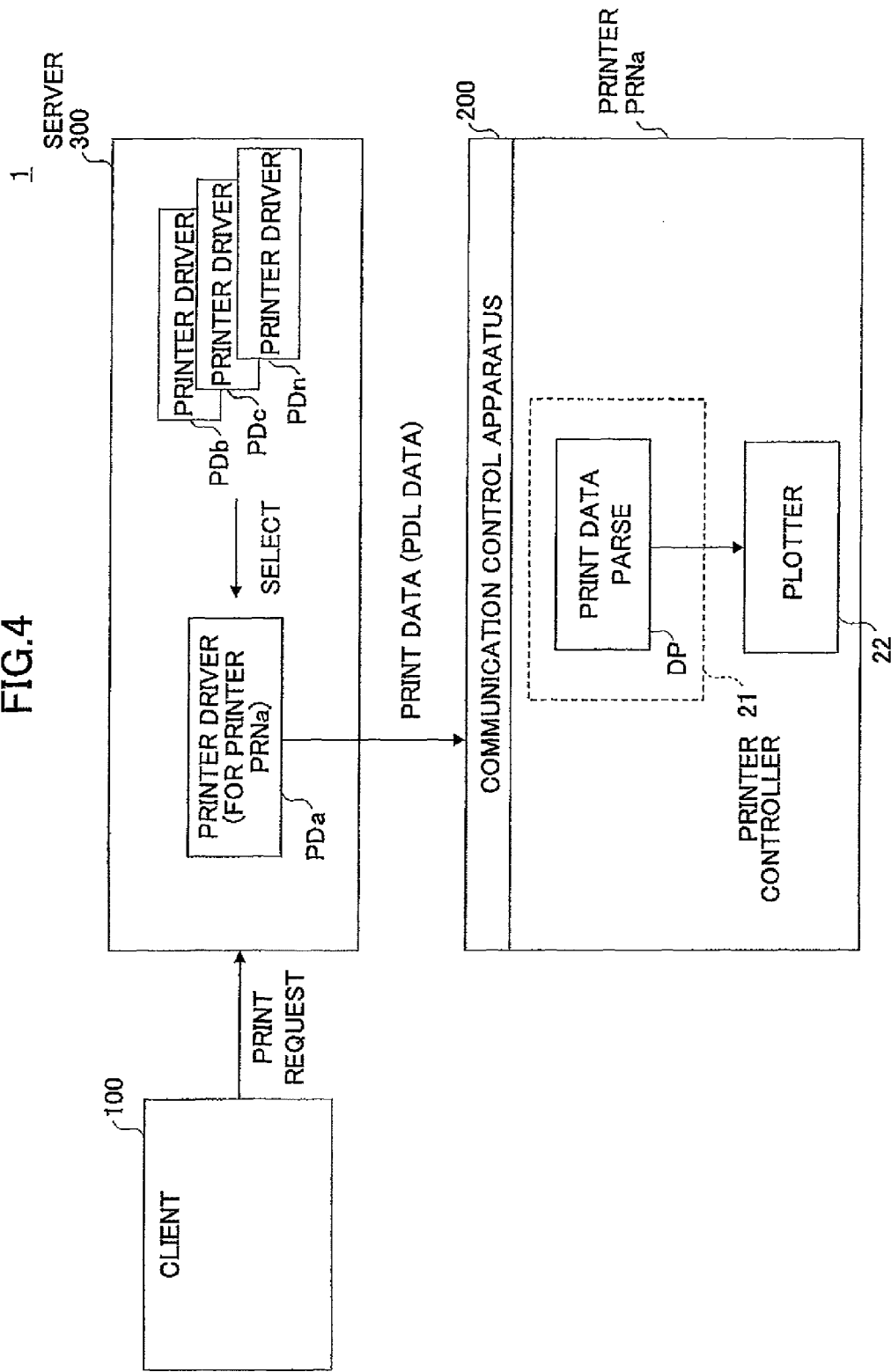

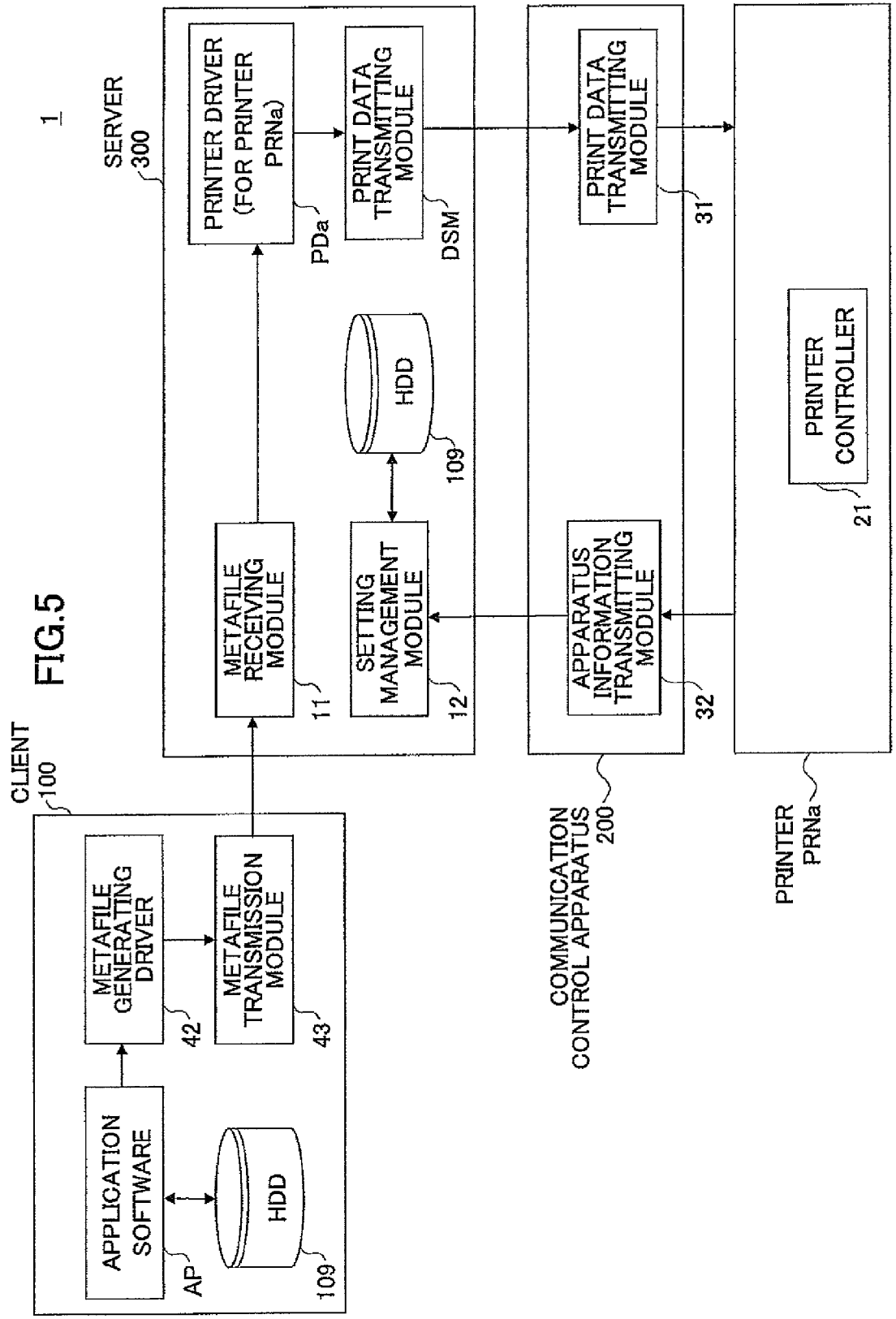

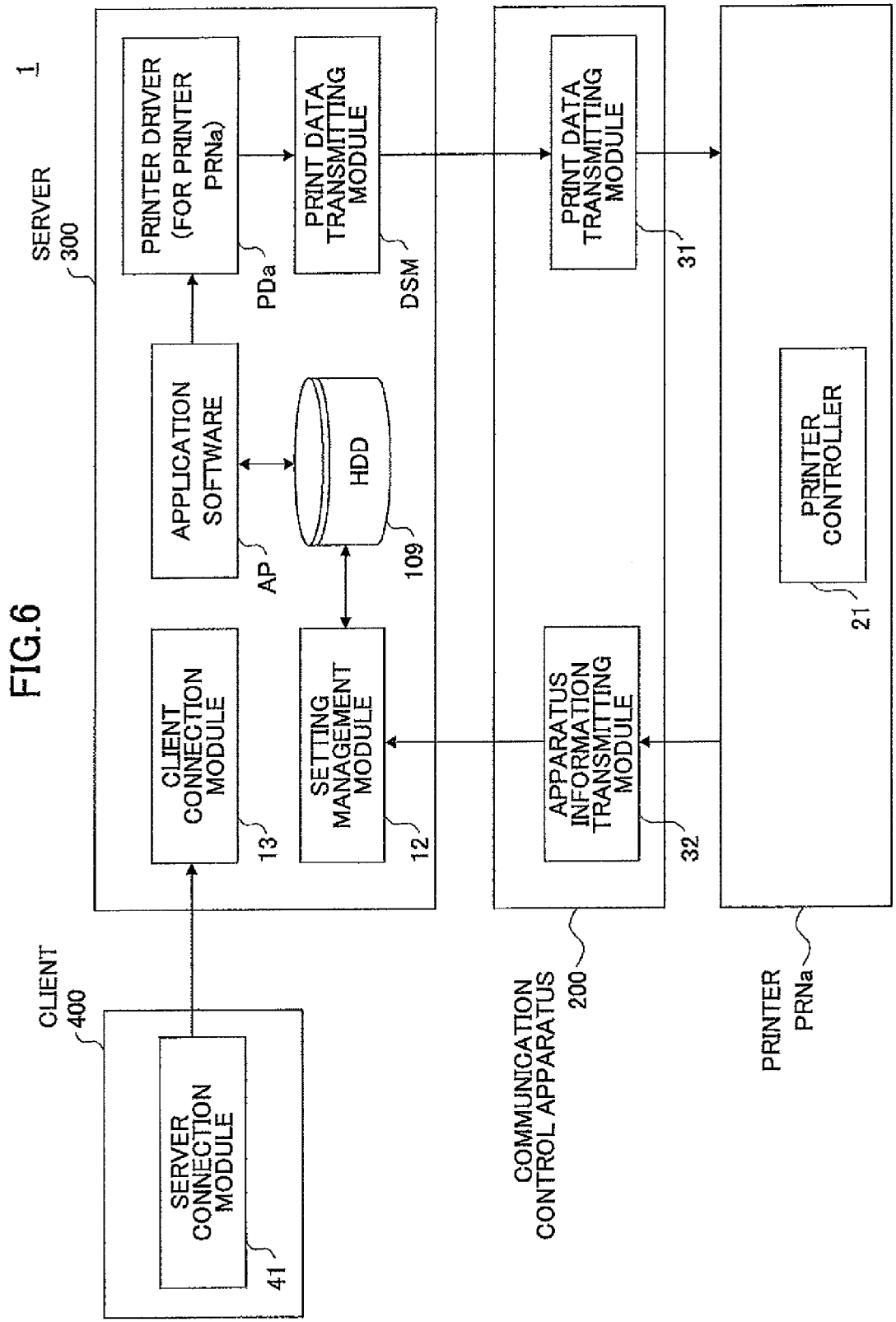

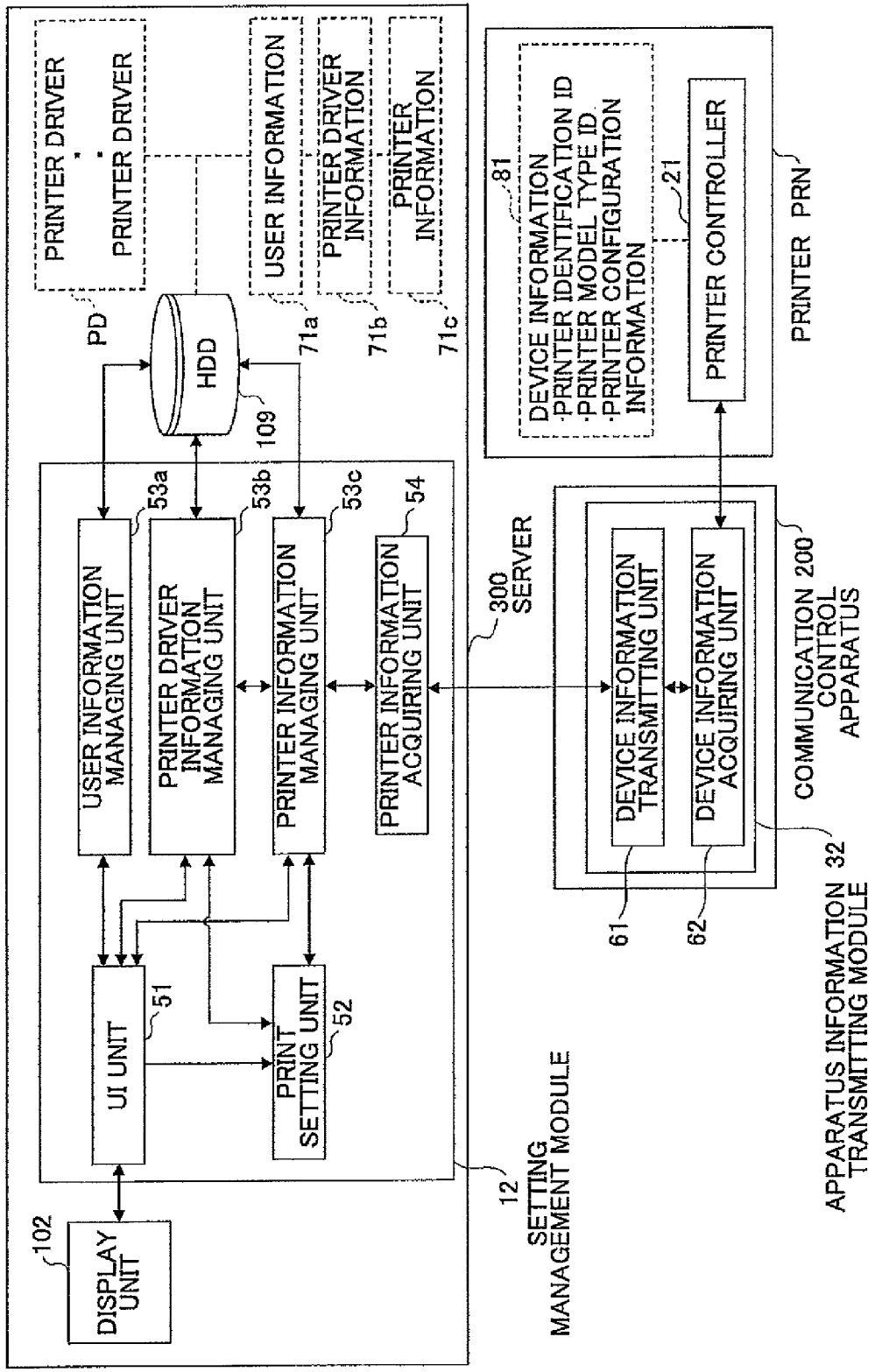

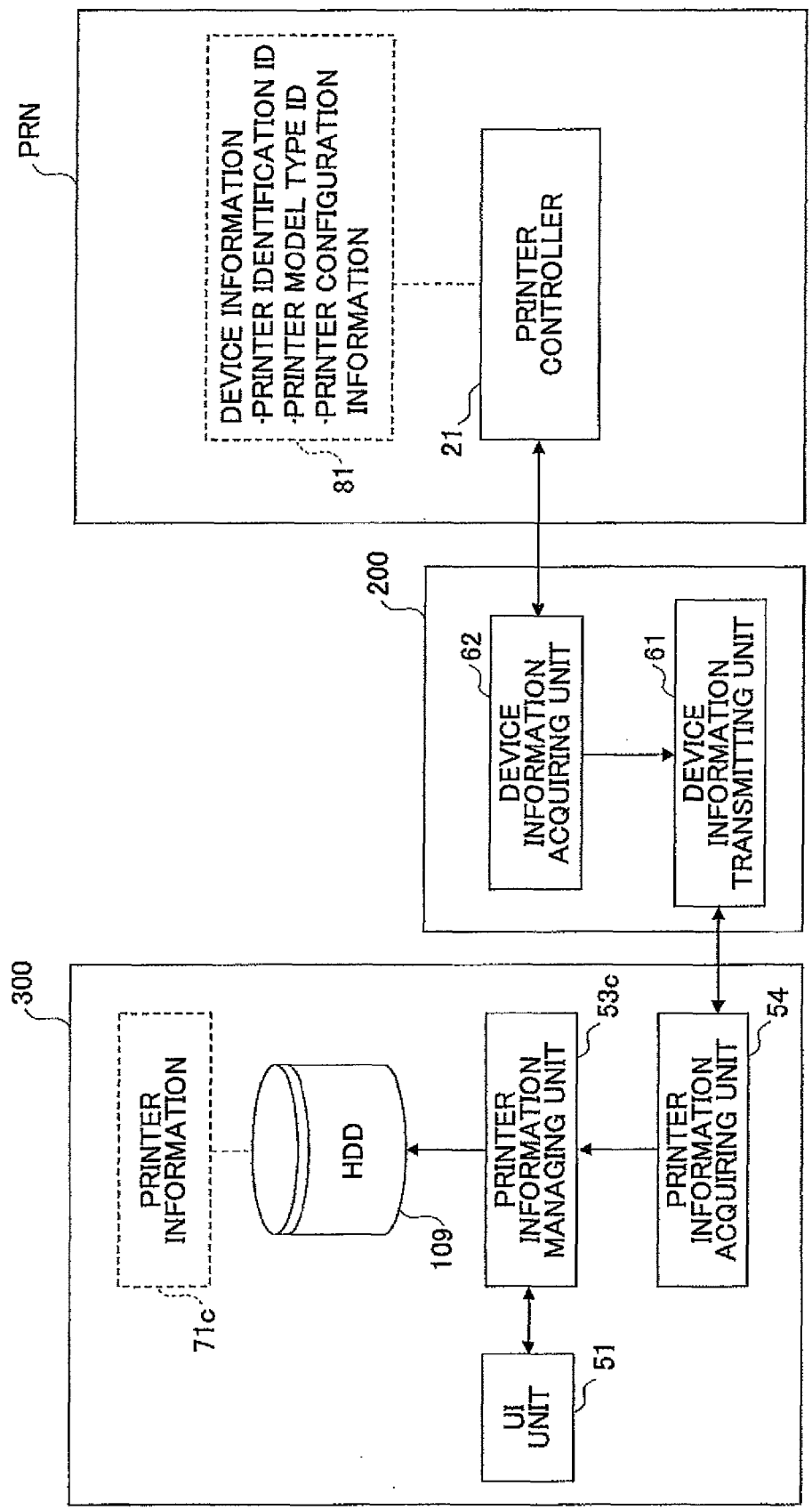

| NETWORK ADDRESS (GLOBAL IP ADDRESS) | PRINTER MODEL TYPE ID | PRINTER INFORMATION |
|---|---|---|
| 123:2345:90:ab:cdef::3494:0076 | abc1234 | DUPLEX UNIT |
| 123:2345:90:ab:cdef::3494:0087 | abc1235 | EXTENDED PAPER DISCHARGE TRAY |
| .... | .... | .... |
| 123:2345:90:ab:cdef::3494:0101 | 7890xyz | LARGE-VOLUME PAPER FEED TRAY |

| NETWORK ADDRESS | PRINTER IDENTIFICATION ID | PRINTER MODEL TYPE ID | PRINTER INFORMATION |
|---|---|---|---|
| 192.168.8.76 | 12345678a | abc1234 | DUPLEX UNIT |
| 192.168.9.87 | 12345678b | abc1235 | EXTENDED PAPER DISCHARGE TRAY |
| .... | .... | .... | .... |
| 192.168.1.23 | abcdefgh1 | 7890xyz | LARGE-VOLUME PAPER FEED TRAY |

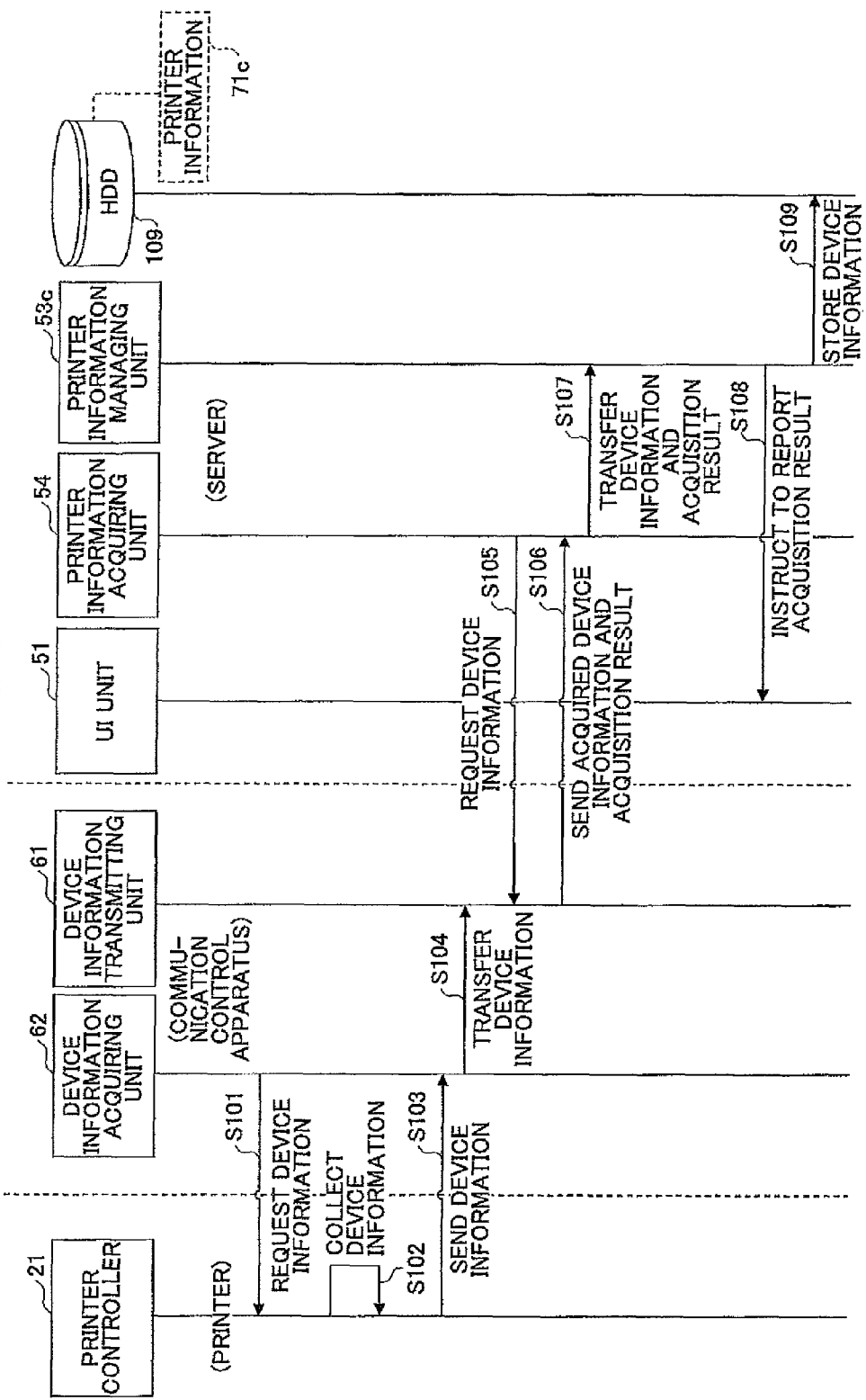

| PRINTER MODEL TYPE ID | PRINTER DRIVER NAME | VERSION |
|---|---|---|
| abc1234 | Y-COMPANY PRINTER DRIVER A | 1.02 |
| abc1235 | Y-COMPANY PRINTER DRIVER B | 1.02 |
| .... | .... | .... |
| 7890xyz | X-COMPANY PRINTER DRIVER C | 1.03 |

FIG.14

| USER ID | REGISTERED PRINTER IDENTIFICATION ID LIST | SELECTED PRINTER IDENTIFICATION ID |
|---|---|---|
| user01@abc.bb.cc | 12345678a, 12345678b | 12345678b |
| user02@abc.bb.cc | 12345678b | 12345678b |
| ..... | ..... | ..... |
| user0X@abc.bb.cc | abcdefgh1, 12345678a | abcdefgh1 |

| PRINTER MODEL TYPE ID | PRINTER DRIVER NAME | VERSION | NAME OF DEVICE INFORMATION ACQUISITION SCRIPT |
|---|---|---|---|
| abc1234 | Y-COMPANY PRINTER DRIVER A | 1.02 | SCRIPT A |
| abc1235 | Y-COMPANY PRINTER DRIVER B | 1.02 | SCRIPT B |
| .... | .... | .... | .... |
| 7890xyz | X-COMPANY PRINTER DRIVER C | 1.03 | SCRIPT C |

71b

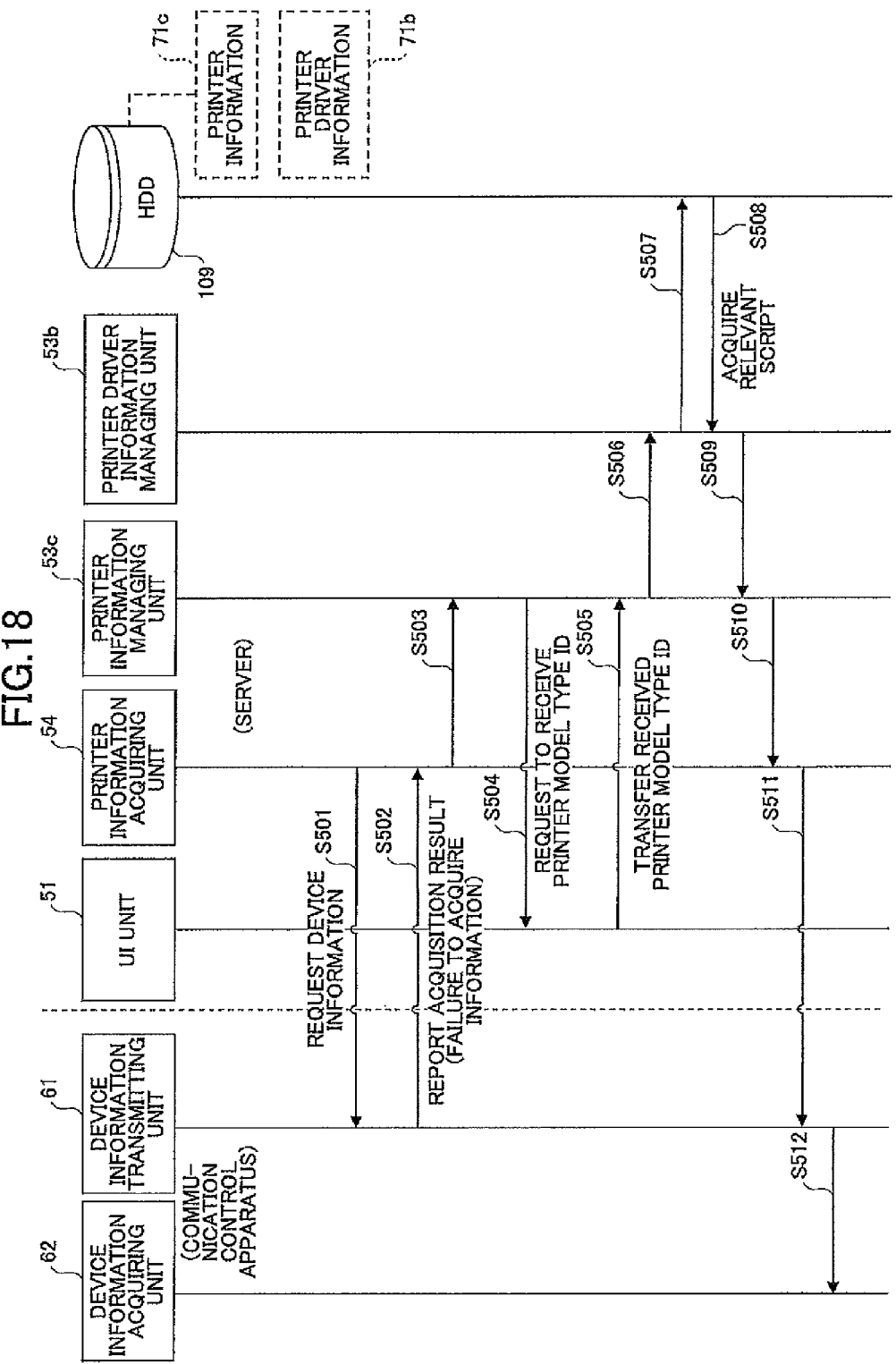

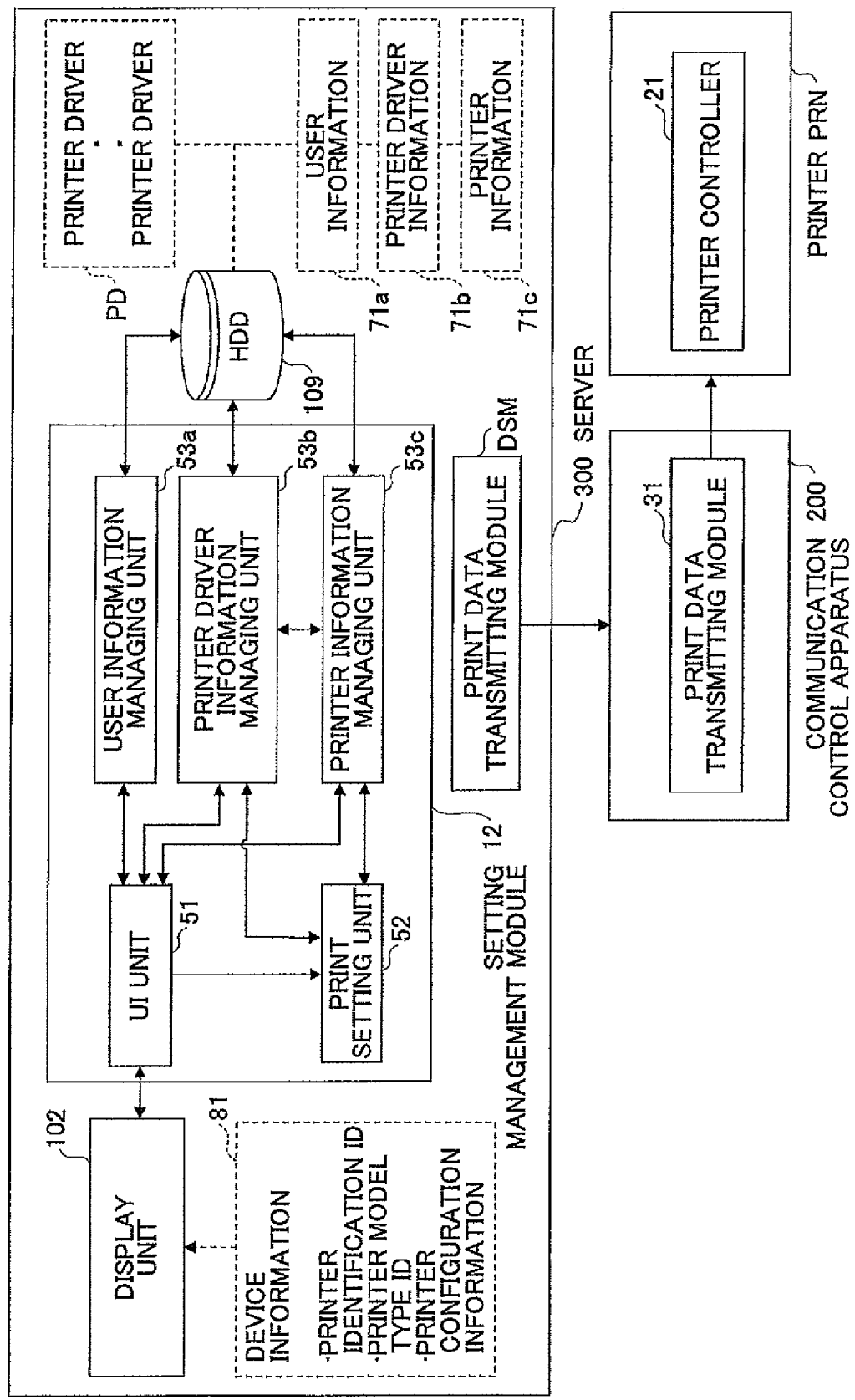

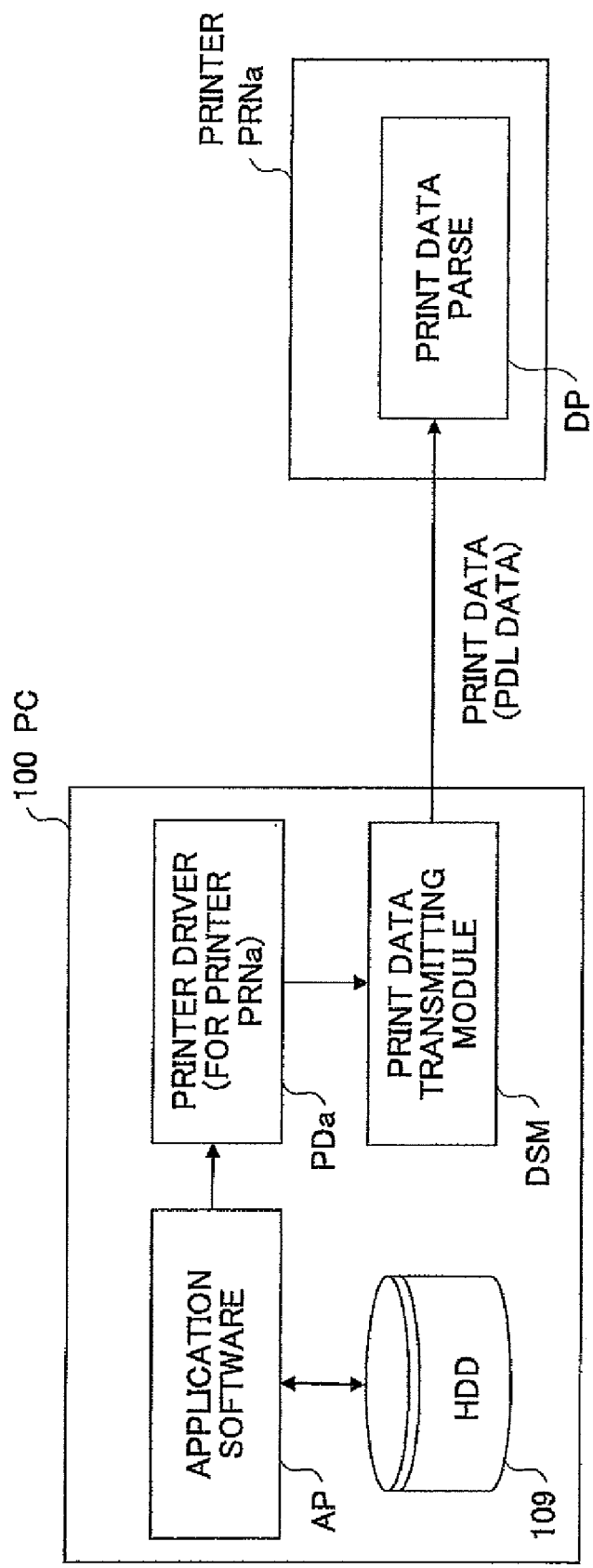

IMAGE FORMING SYSTEM USING A MANAGEMENT APPARATUS TO MANAGE SOFTWARE COMPONENTS

BACKGROUND OF THE INVENTION

1. Field of the Invention

The disclosures herein generally relate to an image forming system, a management apparatus, a communication control apparatus, an image forming method, and an image forming program for forming an image on an image forming medium, and particularly relate to a technology using a management apparatus to manage and operate image forming functions to be provided to users.

2. Description of the Related Art

A related-art image forming system may include apparatuses having software as shown in FIG. 20. Software installed in a PC (personal computer) 100 includes an application software AP for creating and editing document data and image data, a printer driver PDa for generating print data such as PDL (Page Description Language) data based on a metafile that defines a print procedure as requested from the application software AP, and a print data transmission module DSM for transmitting generated print data to a printer PRNa. These software components operate in collaboration with each other to generate print data that has a data format decodable by the printer PRNa based on document data or image data stored in an HDD 109, and transmit the print data to the printer PRNa together with a print request and information indicative of print conditions. The printer PRNa has a print data parse DP installed therein for decoding (interpreting) the print data and generating output-format data in a data format that is recognizable by the printer engine. Based on the operation of this software component, an image is formed and printed on a recording paper sheet based on the print data received from the PC 100.

The problem in such an image forming system is that there is a question as to how to best manage various combinations of a printer driver PDa installed in the PC 100 and a print data parse DP operating at the printer PRNa.

In order to perform proper printing in the image forming system described above, the printer driver PDa installed in the PC 100 needs to be able to generate data in a proper plotter output format that is decodable by the print data parse DP operating at the printer PRNa. That is, there is a mutual dependency between the print data parse DP and the printer driver PDa.

Because of this, the image forming system cannot flexibly and readily cope with a change in its system environment such as an addition or removal of apparatus such as a PC 100 or a printer PRNa, a change of the OS (operating system) of the PC 100, and an upgrade of the print data parse DP operating in the printer PRNa.

There are some patent publications that disclose technologies for overcoming such a problem.

Japanese Patent Application Publication No. 2003-280842 (hereinafter referred to as Patent Document 1) discloses a method of updating a printer driver by uploading a printer driver to a Web page, comparing the version of an installed printer driver with the version of the uploaded printer driver, and downloading the uploaded printer driver to the PC upon finding that the versions are different. Japanese Patent Application Publication No. 2006-134245 (hereinafter referred to as Patent Document 2) discloses an automatic printer-driver install system that performs an automatic install procedure inclusive of making proper connection settings and print settings by downloading a printer driver suitable for a printer selected by a user to be used from a database provided at an external apparatus. Such technologies allow a user to readily and conveniently update a printer driver.

Japanese Patent Application Publication No. 2006-155288 (hereinafter referred to as Patent Document 3) discloses a server apparatus and a printer setting method that install a client printer driver to a server, and assign a printer the same as the client printer to the installed printer driver if the printer driver installed in the client is found to be an unregistered printer driver at the server in a server-based computing system. This allows the same printer driver to be managed and used by the client and the server.

The related-art image forming systems disclosed in Patent Documents 1 through 3 as described above have the following problems.

In the image forming systems described in Patent Documents 1 and 2, a printer driver PD is automatically installed, without requiring user intervention, to an apparatus that is used by a user at the time the user requests printing. In the image forming system disclosed in Patent Document 3, a printer driver PD can be automatically installed to be managed and used by the management apparatus.

In these related-art image forming systems, a printer driver PD having mutual dependency with a print data parse DP operating in an image forming system is managed and operated by each apparatus that is used by a user at the time the user requests printing. It thus follows that the memory area of the memory provided at each apparatus used by a user at the time the user requests printing is inefficiently utilized. For example, a plurality of users may use an image forming system. When print requests to use the same image forming apparatus are made, the printer driver PD corresponding to the image forming apparatus to be used will be installed in each one of the apparatuses that are used by users making the print requests.

In consideration of this, it may be preferable to use only one apparatus for the purpose of managing and operating a printer driver PD as opposed to a related-art configuration in which such a printer driver PD is installed in each apparatus that is used by a user at the time the user requests printing. In such a new configuration, each apparatus that is used by a user at the time the user requests printing may use the printer driver PD installed in the above-noted apparatus for the purpose of printing.

Further, image forming apparatuses used in an image forming system may be products of different manufacturers.

In recent years, various manufacturers have been providing inexpensive and high-performance image forming apparatuses to the market. Users purchase image forming apparatuses that match their needs and operating environments. In some cases, an image forming system may end up including an image forming apparatus that is manufactured by a maker different from the maker who has provided the image forming system.

In consideration of this, a maker who provides an image forming system using a single apparatus for the purpose of managing and operating a plurality of printer drivers PD corresponding to image forming apparatuses needs to accommodate a printer driver PD corresponding to an image forming apparatus manufactured by another maker. That is, it is preferable for the system maker to provide an image forming function that allows such a foreign printer driver PD to be easily managed and operated in the same manner as printer drivers PD corresponding to image forming apparatuses of its own making.

As described above, the related-art image forming systems cannot flexibly cope with a change in the system environments (e.g., an addition or removal of apparatus), especially when image forming apparatuses of different manufacturers are installed. Further, issues that have not been addressed for such systems include the issue of how to centrally manage and operate printer drivers PD corresponding to these image forming apparatuses to provide proper image forming functions to users.

Accordingly, there is a need for an image forming system, a management apparatus, a communication control apparatus, an image forming method, and an image forming program that can flexibly cope with a change in system environment such as an addition of an image forming apparatus manufactured by a different manufacturer.

SUMMARY OF THE INVENTION

It is a general object of at least one embodiment of the present invention to provide an image forming system, a management apparatus, a communication control apparatus, an image forming method, and an image forming program that substantially obviates one or more problems caused by the limitations and disadvantages of the related art.

In one embodiment, an image forming system includes: a plurality of image forming apparatuses; a management apparatus configured to manage and operate the image forming system; and a plurality of communication control apparatuses each configured to control data communication between the management apparatus and a corresponding image forming apparatus, wherein the management apparatus is configured to receive a print request from an information processing apparatus and configured to send an image forming request to an image forming apparatus selected according to the print request as a printing apparatus through a corresponding communication control apparatus, the image forming request requesting to perform a predetermined image forming operation, and wherein the management apparatus includes: a software component storing unit configured to store one or more software components in a predetermined storage area of a storage device of the management apparatus, the one or more software components being each configured to generate print data recognizable by a corresponding image forming apparatus; a selecting unit configured to select a software component from the one or more software components stored in the storage device by the software component storing unit in response to the print request, the selected software component being used to generate print data corresponding to the image forming apparatus selected as a printing apparatus; and a transmission unit configured to transmit the print data generated by the software component selected by the selecting unit to the image forming apparatus selected as a printing apparatus through the corresponding communication control apparatus.

According to one embodiment, a management apparatus for managing and operating an image forming system receives a print request from an information processing apparatus, and sends an image forming request to an image forming apparatus selected according to the print request as a printing apparatus through a communication control apparatus for controlling data communication between the management apparatus and the image forming apparatus, the image forming request requesting to perform a predetermined image forming operation. The management apparatus includes: a software component storing unit configured to store one or more software components in a predetermined storage area of a storage device of the management apparatus, the one or more software components being each configured to generate print data recognizable by a corresponding image forming apparatus; a selecting unit configured to select a software component from the one or more software components stored in the storage device by the software component storing unit in response to the print request, the selected software component being used to generate print data corresponding to the image forming apparatus selected as a printing apparatus; and a transmission unit configured to transmit the print data generated by the software component selected by the selecting unit to the image forming apparatus selected as a printing apparatus through the communication control apparatus.

According to one embodiment, a machine-readable recording medium has an image forming program embodied therein for causing a management apparatus to manage and operate an image forming system, which management apparatus receives a print request from an information processing apparatus, and sends an image forming request to an image forming apparatus selected according to the print request as a printing apparatus through a communication control apparatus for controlling data communication between the management apparatus and the image forming apparatus, the image forming request requesting to perform a predetermined image forming operation. The image forming program causes a computer to function as: a software component storing unit configured to store one or more software components in a predetermined storage area of a storage device of the management apparatus, the one or more software components being each configured to generate print data recognizable by a corresponding image forming apparatus; a selecting unit configured to select a software component from the one or more software components stored in the storage device by the software component storing unit in response to the print request, the selected software component being used to generate print data corresponding to the image forming apparatus selected as a printing apparatus; and a transmission unit configured to transmit the print data generated by the selected software component selected by the selecting unit to the image forming apparatus selected as a printing apparatus through the communication control apparatus.

As described above, the image forming system of the present invention uses a single management apparatus to manage software components (e.g., printer drivers) for generating print data recognizable by image forming apparatuses in such a manner that these components are associated with one or more image forming apparatuses selectable as a printing apparatus.

In the image forming system of the present invention, the management apparatus is configured to receive a print request from a user, to select a software component corresponding to an image forming apparatus designated as a printing apparatus in response to the received print request from the one or more software components stored in its management database, to generate print data from application data by using the selected software component, and to transmit the generated print data to the image forming apparatus through a communication control apparatus.

With this arrangement, the image forming system of the present invention manages and operates printers of different manufacturers by using management data having a unified data configuration, thereby providing an image forming function that can flexibly cope with a change in system environment such as an addition of an image forming apparatus made by another manufacturer.

Further, the management apparatus of the present invention manages software components (e.g., printer drivers) for generating print data recognizable by image forming apparatuses in such a manner that these components are associated with one or more image forming apparatuses selectable as a printing apparatus. Further, the management apparatus is configured to receive a print request from a user, to select a software component corresponding to an image forming apparatus designated as a printing apparatus in response to the received print request from the one or more software components stored in its management database, to generate print data from application data by using the selected software component, and to transmit the generated print data to the image forming apparatus through a communication control apparatus.

In this manner, the management apparatus of the present invention manages and operates printers of different manufacturers by using management data having a unified data configuration, thereby providing an image forming environment that can flexibly cope with a change in system environment such as an addition of an image forming apparatus made by another manufacturer.

Further, the communication control apparatus of the present invention is configured to receive print data transmitted from a management apparatus, to transfer the received print data to an image forming apparatus, and to acquire, from the image forming apparatus, device information for updating image forming apparatus information managed by the management apparatus.

In this manner, the communication control apparatus of the present invention can transfer print data upon establishing data communication with the management apparatus, and can further transmit the device information acquired from the image forming apparatus to the management apparatus thereby to automatically update the image forming apparatus information managed by the management apparatus. Namely, information necessary for the management apparatus is readily collected even from another company's image forming apparatus once the communication control apparatus is connected to the image forming apparatus and placed in condition to perform data communication with the management apparatus.

Further, the management method of the present invention manages software components (e.g., printer drivers) for generating print data recognizable by image forming apparatuses in such a manner that these components are associated with one or more image forming apparatuses selectable as a printing apparatus. Further, the management apparatus is configured to receive a print request from a user, to select a software component corresponding to an image forming apparatus designated as a printing apparatus in response to the received print request from the one or more software components stored in its management database, to generate print data from application data by using the selected software component, and to transmit the generated print data to the image forming apparatus through a communication control apparatus.

In this manner, the management method of the present invention manages and operates printers of different manufacturers by using management data having a unified data configuration, thereby providing an image forming function that can flexibly cope with a change in system environment such as an addition of an image forming apparatus made by another manufacturer.

Further, the image forming program of the present invention used in an image forming apparatus employs a single computer to manage software components (e.g., printer drivers) for generating print data recognizable by image forming apparatuses in such a manner that these components are associated with one or more image forming apparatuses selectable as a printing apparatus. Further, the image forming program is configured to cause a computer to receive a print request from a user, to select a software component corresponding to an image forming apparatus designated as a printing apparatus in response to the received print request from the one or more software components stored in its management database, to generate print data from application data by using the selected software component, and to transmit the generated print data to the image forming apparatus through a communication control apparatus.

Accordingly, the image forming program of the present invention can provide an image forming function that can flexibly cope with a change in system environment such as an addition of an image forming apparatus manufactured by a different manufacturer.

According to at least one embodiment of the present invention, an image forming system, a management apparatus, a communication control apparatus, an image forming method, and an image forming program can flexibly cope with a change in system environment such as an addition of an image forming apparatus manufactured by a different manufacturer.

BRIEF DESCRIPTION OF THE DRAWINGS

Other objects and further features of embodiments will be apparent from the following detailed description when read in conjunction with the accompanying drawings.

FIG. 3 is a drawing showing an example of the hardware configuration of a communication control apparatus according to the first embodiment;

FIG. 4 is a drawing showing an example of an image forming process according to the first embodiment;

FIG. 5 is a drawing showing an example of the software configuration of the image forming system according to the first embodiment;

FIG. 6 is a drawing showing an example of the software configuration of the image forming system according to the first embodiment;

FIG. 7 is a drawing showing an example of the functional configuration of the image forming system according to the first embodiment;

FIG. 8 is a drawing showing an example of the operation of recording and updating printer information managed by a server according to the first embodiment;

FIGS. 9A and 9B are drawings showing examples of the data configuration of printer information according to the first embodiment;

FIG. 10 is a sequence chart showing an example of the registration of printer information through the communication control apparatus according to the first embodiment;

FIG. 12 is a drawing showing an example of the data configuration of printer driver information according to the first embodiment;

FIG. 14 is a drawing showing an example of the data configuration of user information according to the first embodiment;

FIG. 17 is a drawing showing an example of the data configuration of printer driver information according to the second embodiment;

FIG. 18 is a drawing showing an example of the procedure of acquiring device information according to the second embodiment;

FIG. 19 is a drawing showing an example of the functional configuration of the image forming system according to the third embodiment; and FIG. 20 is a drawing showing an example of the system configuration of a related-art image forming system.

DESCRIPTION OF THE PREFERRED EMBODIMENTS

In the following, embodiments of the present invention will be described in detail with reference to accompanying drawings.

First Embodiment

<System Configuration>

Figure 1:
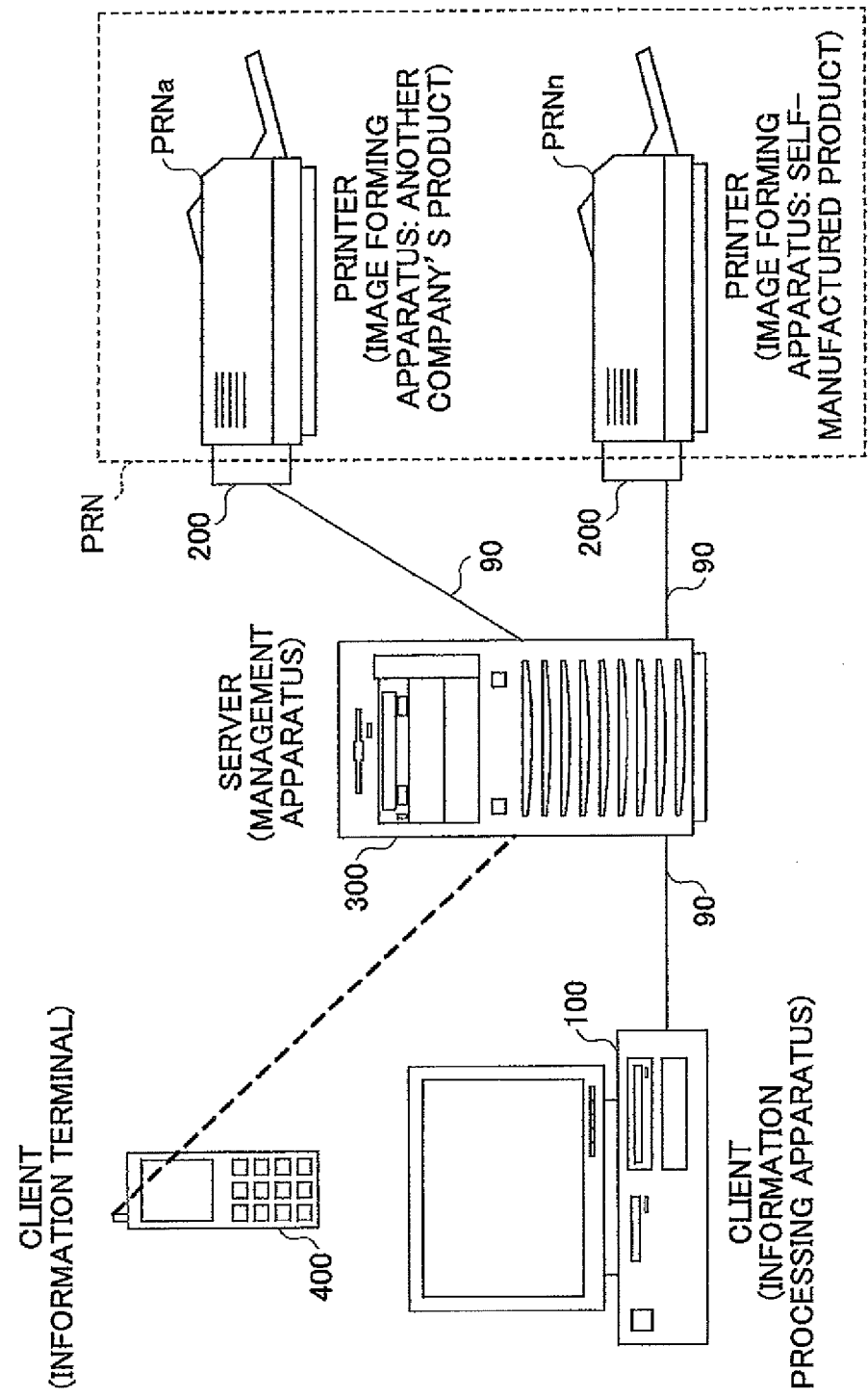
FIG. 1 is a drawing showing an example of the system configuration of an image forming system according to a first embodiment.

The system configuration of an image forming system 1 according to an embodiment will be described first. FIG. 1 is a drawing showing an example of the system configuration of the image forming system 1 according to a first embodiment.

As shown in FIG. 1, the image forming system 1 of the present embodiment includes a client (information processing apparatus) 100, a server (management apparatus) 300, and printers (image forming apparatuses) PRN. The client 100 has various types of application software installed therein, and transmits application data generated by the application software to the server 300. The server 300 receives the application data from the client 100, and performs predetermined image processing on the received application data to generate print data, followed by transmitting the generated print data to a printer PRN to request printing. The printer PRN receives the print data from the server 300, and performs a predetermined image forming process (i.e., performs printing) according to the print request based on the received print data. The server 300, the client 100, and the printers PRN are connected through data transmission lines 90 that can transmit application data, print data, and the like.

The printers PRN provided in the image forming system 1 include a printer PRNn manufactured by a maker that provides the image forming system 1 (such a printer may hereinafter be referred to as a self-manufactured printer), and also includes a printer PRNa that is a product of another maker (such a printer may hereinafter be referred to as another company's printer). These printers PRN are connected to the data transmission lines 90 through respective communication control apparatuses 200. A communication control apparatus 200 provides the function to control two-way communication between a printer PRN and the server 300 for the purpose of allowing the image forming function of the printer PRN to be utilized in the image forming system 1.

In the manner as described above, plural printers PRN of different manufacturers are provided in the image forming system 1 of the present embodiment.

The data transmission lines 90 connecting between the client 100, the server 300, and the printers PRN may be network cables, for example. The client 100, the server 300, and the printers PRN may be connected through a network (electrical communication lines) such as a LAN (Local Area Network) or a WAN (Wide Area Network) implemented by use of wire or radio communication lines, so that two-way data communication is performed between these apparatuses.

Due to the advancement of information processing technology and communication technology, apparatuses that are used by users to request printing to the printers PRN may include not only the client 100 such as a PC, but also a portable information terminal such as a portable phone or PDA (Personal Digital Assistants). In the image forming system 1, a client (information terminal) 400 such as a mobile phone or PDA can also be used to have data communication with the server 300 through a predetermined electrical communication means.

In the description of the system configuration provided above, the printers PRN having an image forming function as its main function are used as an example of apparatuses that perform a predetermined image forming process according to a print request based on the print data that are received from the server 300. The present invention is not intended to be limited to this example. An image forming apparatus used in this system may be a multifunction peripheral that has a plurality of functions (e.g., a copy function, a facsimile function, etc.) inclusive of an image forming function. In the following, a description will be given of an example in which the printers PRN are used as apparatuses that perform a predetermined image forming process for the sake of simplicity of explanation.

<Hardware Configuration>

In the following, a description will be given of the hardware configurations of the client 100 serving as an information processing apparatus, the server 300 serving as a management apparatus, and the communication control apparatus 200 provided in the image forming system 1. It should be noted that a description of the client 400 will be omitted because the client 400 is simply a variation of the information processing apparatus that has the communication function to be connected to the server 300.

<<Information Processing Apparatus & Management Apparatus>>

Figure 2:
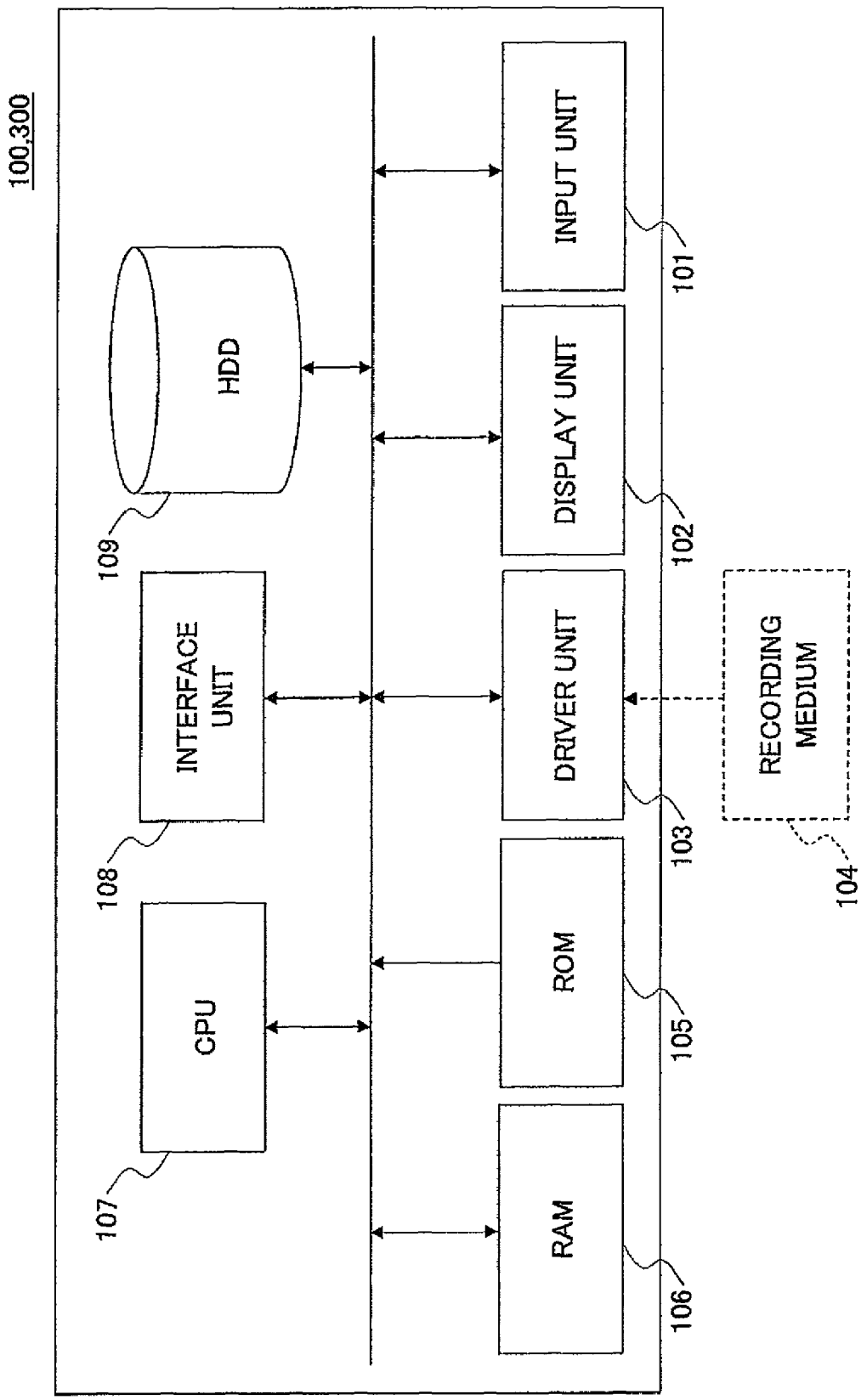
FIG. 2 is a drawing showing an example of the hardware configuration of an image processing apparatus according to the first embodiment.

FIG. 2 is a drawing showing an example of the hardware configuration of the information processing apparatus 100 and the management apparatus 300 according to the first embodiment.

Each of the information processing apparatus 100 and the management apparatus 300 according to the present embodiment may be a conventional personal computer, and includes an input unit 101, a display unit 102, a driver unit 103, a ROM (Read Only Memory) 105, a RAM (Random Access Memory) 106, a CPU (Central Processing Unit) 107, an interface unit 108, and an HDD (Hard Disk Drive) 109, which are connected to each other through a bus.

The input unit 101 includes a keyboard and mouse, for example, and is used to enter various operating signals into the information processing apparatus 100 and the management apparatus 300. The display unit 102 may be implemented as a display screen, and may display a UI screen (User Interface screen) of application software. The interface unit 108 is an interface that connects the information processing apparatus 100 or the management apparatus 300 to the data transmission line 90 that is an electrical communication line. The HDD 109 stores an OS (operating system) that is basic software, application programs and associated data such as document creation software and image editing software, document data, and image data, for example. The HDD 109 manages and controls these various programs and data by use of a predetermined file system and DB (database) system.

The various programs and associated data are provided to the information processing apparatus 100 or the management apparatus 300 via a recording medium 104 such as a CD-ROM (Compact Disk Read Only Memory). Upon mounting the recording medium 104 containing the various programs and associated data to the driver unit 103, the various programs and associated data are installed from the recording medium 104 to the HDD 109 through the driver unit 103. The various programs and associated data may alternatively be downloaded and installed from an external storage unit to the HDD 109 through an electrical communication line such as the data transmission line 90.

The ROM 105 stores BIOS (Basic Input/Output System) programs and various data that are executed or used at the time of power on of the information processing apparatus 100 or the management apparatus 300. The RAM 106 serves as a temporal storage to temporarily store the programs and data retrieved from the ROM 105 and the HDD 109. The CPU 107 executes the programs temporarily stored in the RAM 106.

<<Communication Control Apparatus>>

FIG. 3 is a drawing showing an example of the hardware configuration of the communication control apparatus according to the first embodiment.

The communication control apparatus 200 of the present embodiment includes a ROM 201, a RAM 202, an NVRAM (nonvolatile RAM) 203, a CPU 204 and two types of interface units 205 and 206, which are connected to each other through a bus.

The ROM 201 stores various programs and associated data that are executed or used at the time of power on of the communication control apparatus 200 to control the two types of interface units, and also stores various programs and associated data for performing data communication control. The RAM 202 serves as a temporal storage to temporarily store the various programs and associated data retrieved from the ROM 201. Further, the NVRAM 203 stores default operation settings that are used for data communication functions provided by the communication control apparatus 200. Such default operation settings include default values relating to communication control conditions. The CPU 204 executes the programs temporarily stored in the RAM 202.

The interface unit 205 is an interface connected to the data transmission line 90 that is an electrical communication line. In the present embodiment, a conventional IP address (i.e., a network address complying with IPv4 (RFC791 compliant)) or a global IP address (i.e., a network address complying with IPv6 (RFC2460 compliant)) is assigned to the interface unit 205 when network data communication is to be performed through the interface unit 205. The "global IP address" refers to an IP address that is unique in the world, and that is officially assigned by an address assigning agency (i.e., NIC (Network Information Center) of each country) when an apparatus is to be connected to the Internet.

A print environment that is provided to users in related-art image forming systems is intended to provide a capability of using printers PRN that are installed at a particular location such as within an office. Namely, users can only print to printers PRN that are connected to a predetermined network area such as a LAN or WAN. As a result of the advance of communication technology (including increases in the speed and volume of data transmission), the Internet that can transfer a large amount of data is now widely used. Users who have access to the Internet can thus specify a global IP address to uniquely identify a printer PRN that is connected to the Internet. This eliminates usage restriction as observed in conventional systems.

The interface unit 206 is an interface for connecting the communication control apparatus 200 to an apparatus such as a printer PRN. The interface unit 206 receives data through the interface unit 205 from another apparatus (e.g., server 300) provided in the image forming system 1, and transfers the received data to the apparatus to which the communication control apparatus 200 is connected. The interface unit 206 also receives data from the apparatus to which the communication control apparatus 200 is connected, and transfers the received data to another apparatus that is provided in the image forming system 1.

As in the manner described above, the communication control apparatuses 200 having the hardware configuration as described above are connected to the image forming system 1 of the present embodiment when the printers PRN are installed in the image forming system 1. With this arrangement, the client 100, the server 300, and the printers PRN are connected to each other through electrical communication lines in the image forming system 1 to perform an image forming process responsive to a print request supplied from a user.

<Software Configuration>

The software configuration of the image forming system 1 according to the present embodiment will be described. In the following description of software configuration, an image forming process according to the present embodiment will be described first, followed by a description of the software configuration of each apparatus constituting the image forming system 1.

<<Image Forming Process>>

In the following, the procedure of an image forming process performed in the image forming system 1 according to the present embodiment will be described by referring to FIG. 4. FIG. 4 is a drawing showing an example of an image forming process according to the first embodiment. FIG. 4 shows an example in which a user specifies another company's printer PRNa to request printing.

<<<Procedure Step 1: Print Request from User>>>

The client 100 accesses the server 300 via the interface unit 108, and transmits various setting values to the server 300 to request a start of printing. These setting values are received from the user via a UI (user interface) function of predetermined application software such as a Web browser, and include print conditions and a printer indication such as information that uniquely identifies another company's printer PRNa on the network.

<<<Procedure Step 2: Selection of Optimal Printer Driver PD>>>

The server 300 selects a printer driver PDa from a plurality of printer drivers PD installed in the server 300 in response to the setting values of the printer indication received from the client 100. The printer driver PDa is selected because it can generate print data (e.g., PDL (Page Description Language) data) decodable by the print data parse DP operating in a printer controller 21 of another company's printer PRNa that is specified by the printer indication.

<<<Procedure Step 3: Generation and Transmission of Print Data>>>

The server 300 uses the selected printer driver PDa to generate print data from the application data. The server 300 then transmits the generated print data to another company's printer PRNa that is selected as a print apparatus (i.e., indicated by the print indication).

<<<Procedure Step 4: Decoding of Print Data and Generation of Plotter-Output-Format Data>>>

Another company's printer PRNa receives the print data transmitted from the server 300 through the communication control apparatus 200, and uses the print data parse DP operating in the printer controller 21 to decode the received print data. Based on the decoded results, the print data parse DP generates plotter-output-format data (e.g. image data such as bitmap image data) that is recognizable by a plotter 22 serving as a printer engine. The generated plotter-output-format data is supplied from the printer controller 21 to the plotter 22.

<<<Procedure Step 5: Print>>>

Another company's printer PRNa uses the plotter 22 to form an image on an image forming medium such as a paper sheet in response to the supplied plotter-output-format data.

In the image forming system 1 according to the present embodiment as described above, an optimum printer driver PDa that is centrally managed and operated in the server 300 is selected in response to an indication of another company's printer PRNa as specified by a user. Such a selection is made without regard to the environment of the apparatus such as the client 100 that is used by the user at the time of print request, and provides a print service that performs proper printing.

In order to achieve proper print service utilizing another company's printer PRNa as described above, the following needs to be performed. First, an optimum printer driver PDa that generates print data decodable by another company's printer PRNa selected as a printing apparatus needs to be selected from a plurality of printer drivers PD installed in the server 300 corresponding to printers PRN of different manufacturers connected to the image forming system 1. Then, the print data generated by using the selected printer driver PDa needs to be supplied to another company's printer PRNa selected as a printing apparatus.

To this end, the image forming system 1 according to the present embodiment has software configurations as described in the following.

<<Software Configuration of Each Apparatus>>

In the image forming system 1 of the present embodiment, software components installed in each apparatus will differ between the case of using the client 100 (i.e., information processing apparatus such as a PC) capable of executing application software AP for creating and editing document data and/or image data to be printed and the case of using the client 400 (i.e., information terminal such as a portable phone or PDA) incapable of executing application software AP. In consideration of this, a description in the following will be first directed to a configuration in which the system is comprised of the client 100, the server 300, and another company's printer PRNa. Thereafter, a description will be given of a system that is comprised of the client 400, the server 300, and another company's printer PRNa by focusing attention on differences from the former system.

<<<System Configuration 1: Configuration inclusive of PC Client, Server, and Another Company's Printer>>>

FIG. 5 is a drawing showing an example of the software configuration of the image forming system 1 according to the first embodiment.

<<Client (Information Processing Apparatus)>>

The software component set installed in the client 100 according to the present embodiment includes application software AP used to edit and create document data and image data, a metafile generating driver 42 for generating from the application software AP a metafile defining a series of rendering steps in a data format executable by the server 300, and a metafile transmission module 43 for transmitting a generated metafile to the server 300. These software components are stored (installed) in predetermined storage areas of the HDD 109 provided in the client 100. The software components are retrieved from the HDD 109 to be loaded to the RAM 106 for execution by the CPU 107. As shown in FIG. 5, the client 100 does not include a printer driver.

<<Server (Management Apparatus)>>

The software component set installed in the server 300 according to the present embodiment includes a metafile receiving module 11, a printer driver PDa, a print data transmitting module DSM, and a setting management module 12. The metafile receiving module 11 receives a metafile transmitted from the client 100. The printer driver PDa corresponds to another company's printer PRNa, and generates print data from the metafile. The print data transmitting module DSM transmits the generated print data to the communication control apparatus 200 that is identified by the transmission destination setting. The setting management module 12 selects the printer driver PDa corresponding to another company's printer PRNa used as a printing apparatus, and also makes settings to printer drivers. The setting management module 12 stores and manages various settings in predetermined storage areas of the HDD 109 to control an image forming operation in the image forming system. The various settings include a transmission destination setting (i.e., an indication of a destination to which the generated print data is to be sent) to be used by the print data transmitting module DSM. These software components are stored (installed) in predetermined storage areas of the HDD 109 provided in the server 300. The software components are retrieved from the HDD 109 to be loaded to the RAM 106 for execution by the CPU 107. As shown in FIG. 5, the printer driver PDa is located only in the server 300.

<<Communication Control Apparatus>>

The software component set installed in the communication control apparatuses 200 according to the present embodiment includes a print data transmitting module 31 and an apparatus information transmitting module 32. The print data transmitting module 31 receives print data from the server 300 through the interface unit 205, and transfers the received print data through the interface unit 206 to another company's printer PRNa. The apparatus information transmitting module 32 acquires device information inclusive of status information about another company's printer PRNa from another company's printer PRNa through the interface unit 206. The apparatus information transmitting module 32 transmits the acquired device information to the server 300 through the interface unit 205. These software components are stored in the ROM 201 of the communication control apparatus 200. The software components are retrieved from the ROM 201 to be loaded to the RAM 202 for execution by the CPU 204.

<<Outline of Image Forming Process>>

Provided with the software configuration as describe above, the image forming system 1 according to the present embodiment performs the following procedure to allow the client 100 to print to another company's printer PRNa.

<<<Procedure Step 1: Generation and Transmission of Metadata by Client>>>

The client 100 uses the metafile generating driver 42 to generate a metafile defining the steps of rendering an image in accordance with a user print request received through the application software AP. The client 100 then transfers the generated metafile to the metafile transmission module 43. The metafile transmission module 43 transmits the generated metafile to the server 300.

<<<Procedure Step 2: Generation and Transmission of Print Data by Server>>>

The server 300 receives the metafile transmitted from the client 100 by use of the metafile receiving module 11, and transfers the received metafile to the printer driver PDa. The server 300 then uses the printer driver PDa to generate print data from the metafile. In so doing, the server 300 selects the printer driver PDa corresponding to another company's printer PRNa specified as a printing apparatus from a plurality of printer drivers PD to generate print data. Such a selection of the printer driver PDa is made based on printer driver settings among the various settings for controlling an image forming operation that are received from the apparatus information transmitting module 32 of the communication control apparatus 200 and managed by the setting management module 12. The server 300 transfers the generated print data to the print data transmitting module DSM. Thereafter, the server 300 uses the print data transmitting module DSM to transmit the print data to the communication control apparatus 200 in response to the transmission destination setting.

<<<Procedure Step 3: Printing by Another Company's Printer>>>

Another company's printer PRNa uses a software component (e.g., PDL parser) operating in the printer controller 21 to decode (i.e., interpret) the print data transferred from the print data transmitting module 31 operating in the communication control apparatus 200. Another company's printer PRNa then transfers the plotter-output-format data generated based on the decoded results to the plotter 22. Consequently, the plotter 22 of another company's printer PRNa prints an image on a recording paper sheet.

In this manner, the image forming system 1 according to the present embodiment performs the above-described procedure to allow a conventional PC (i.e., client 100) to print to another company's printer PRNa through the server 300 connected via electrical communication lines.

<<<System Configuration 2: Configuration inclusive of Portable Client, Server, and Another Company's Printer>>>

Software configurations of the second system configuration differ from those of the first system configuration described above in the following points. FIG. 6 is a drawing showing an example of the software configuration of the image forming system 1 according to the first embodiment.

<<Client (Information Terminal)>>

The client 400 differs from the client 100 used in the first system configuration described above in that the client 400 only has a server connection module 41 that is connected to the server 300 to provide a UI function (i.e., user interface function), which allows a user to operate application software AP running on the server 300.

<<Server (Management Apparatus)>>

The server 300 differs from the server 300 of the first system configuration previously described in that a client connection module 13 and application software AP are provided in addition to the printer driver PDa, the print data transmitting module DSM, and the setting management module 12 in such a manner as to replace the metafile receiving module 11. The client connection module 13 controls two-way data communication with the client 400. The application software AP is the same as the application software AP running on the client 100.

<<Outline of Image Forming Process>>

Provided with the software configuration as describe above, the image forming system 1 according to the present embodiment performs the following procedure to allow the client 400 to print to another company's printer PRNa. Differences from the first system configuration previously described reside in the part of the procedure that is performed prior to the transfer of a metafile from the application software AP to the printer driver PDa.

<<<Procedure Step 1: Connection from Client to Server>>>

The client 400 uses the server connection module 41 to connect to the server 300.

<<<Procedure Step 2: Operating Application Software Via UI Function>>>

The client 400 remotely operates the application software AP in accordance with data operating instructions received from a user through the UI function, and transfers a generated metafile to the printer driver PDa. The server 300 then uses the printer driver PDa to generate print data from the metafile. The steps that will be performed to print an image by use of another company's printer PRNa based on the generated print data are the same as the procedure of the first system configuration previously described.

In this manner, the image forming system 1 according to the present embodiment performs the above-described procedure to allow an information terminal (i.e., client 400) such as a portable phone or PDA to print to another company's printer PRNa through the server 300 connected via electrical communication lines.

With the hardware configuration and software configuration described above, the image forming system 1 of the present embodiment causes the server 300 to select a printer driver PDa that properly matches another company's printer PRNa selected by a user as a printing apparatus, to generate print data by the selected printer driver PDa, and to transmit the generated print data to another company's printer PRNa selected as a printing apparatus. This arrangement provides an image forming function that allows a user terminal such as the client 100 and the client 400 to print to another company's printer PRNa through the server 300.

In the following, a description will be given of how the image forming system 1 of the present embodiment performs the image forming operation described above.

<Image Forming Process>

As was previously described in connection with the software configuration, the image forming system 1 according to the present embodiment consolidates plural printer drivers PD at the server 300, and performs central management and operation. Because of this, the issue of how the image forming function of the image forming system 1 performs the following procedure becomes important. That is, when a user selects another company's printer PRNa as a printing apparatus, the server 300 needs to select a proper printer driver PDa matching another company's printer PRNa selected as a printing apparatus from a plurality of printer drivers PD that are already installed to use the printers PRN providing print services. Further, the server 300 needs to use the selected printer driver PDa to generate print data that is to be transmitted to another company's printer PRNa. In order to provide the image forming function of the image forming system 1 of the present embodiment, thus, the important issue is how the setting management module 12 executed by the server 300 makes settings relating to an image forming operation, and centrally manages and operates the installed printer drivers PD.

In consideration of this, a description will now be given of the configuration of each functional unit that provides various setting functions (hereinafter referred to as "operation control setting functions") for controlling an image forming operation performed by the image forming function of the image forming system 1 according to the present embodiment. FIG.

7 is a drawing showing an example of the functional configuration of the image forming system 1 according to the first embodiment.

<<Outline of Operation Control Setting Function>>

In the image forming system 1 of the present embodiment, the server 300 centrally manages and operates printer drivers PD. To this end, the server 300 includes a UI unit 51, a print setting unit 52, a user information managing unit 53a, a printer driver information managing unit 53b, a printer information managing unit 53c, and a printer information acquiring unit 54. The communication control apparatus 200 connected to the printers PRN includes a device information transmitting unit 61 and a device information acquiring unit 62.

These functional units provided in the server 300 of the present embodiment are provided by the operation of the setting management module 12. The above-noted functional units provided in the communication control apparatus 200 of the present embodiment are provided by the operation of the apparatus information transmitting module 32 that has been previously described in connection with the software configuration. In the following, each functional unit will be described.

The UI unit 51 of the server 300 serves to provide a UI function that is used to set values to various settings for the purpose of controlling an image forming operation as set for each of the printers PRN connected to the image forming system 1. Such a UI is provided to a user through the display unit 102 of a user terminal such as the client 100 or the client 400.

The print setting unit 52 serves to make settings to control parameters for controlling an image forming operation according to the various setting values received from the UI unit 51. The control parameters may include a name of a printer driver to be used, a network address of a destination, print conditions, etc.

The user information managing unit 53a serves to manage user information 71a a that associates users with printers PRN that are selectable as a printing apparatus. The user information 71a a will be described later.

The printer driver information managing unit 53b serves to manage printer driver information 71b that associates the printers PRN with the printer drivers PD as will be described later.

The printer information managing unit 53c serves to manage printer information 71c that includes device information 81 about the printers PRN as will be described later.

These three information managing units read and write the above-noted information from and to predetermined storage areas of the HDD 109 according to need for the purpose of managing various information.

The printer information acquiring unit 54 serves to acquire device information 81 from the printers PRN.

The device information transmitting unit 61 of the communication control apparatus 200 serves to transmit to the server 300 the device information 81 about the printer PRN connected through the interface unit 206

The device information acquiring unit 62 serves to acquire device information 81 from the printer PRN through the interface unit 206. The device information 81 acquired by the device information acquiring unit 62 includes identification information (hereinafter referred to as "printer identification ID") for identifying the printer PRN, model-type identification information (hereinafter referred to as "printer model type ID") for identifying a model type of the printer PRN, and printer configuration information about option devices (e.g., a "duplex unit", a "large capacity tray", and so on) provided for the printer PRN.

In the following, a description will be given of the detail of operations of each functional unit when various settings are to be made for the purpose of controlling an image forming operation in response to an instruction received from a user through the UI unit 51 in the image forming system 1 of the present embodiment.

<Registration of Printer>

In the image forming system 1 of the present embodiment, a user specifies a printer indication indicative of an printing apparatus through a user terminal such as the client 100 or the client 400. Based on this printer indication, the image forming system 1 needs to uniquely identify one of the printers PRN connected through electrical communication lines. For example, another company's printer PRNa may need to be identified as a data destination, so that print data generated in response to a print request can be transmitted to such another company's printer PRNa that is selected as a printing apparatus. To this end, various information is registered in the server 300 for the purpose of uniquely identifying each of another company's printers PRNa that are selectable as a printing apparatus in the provided print service. In the image forming system 1, as shown in an operation example illustrated in FIG. 8, the server 300 acquires the device information 81 about the printers PRN through the communication control apparatuses 200 from the printers PRN that are selectable as a printing apparatus. The server 300 then registers the acquired device information 81 as information for identifying a printer PRN selected as a printing apparatus.

FIG. 8 is a drawing showing an example of the operation of recording and updating the printer information 71c managed by the server 300 according to the first embodiment.

As shown in FIG. 8, the server 300 uses the printer information acquiring unit 54 to acquire the device information 81 of the printer PRN through the communication control apparatus 200 connected to the printer PRN. To this end, the communication control apparatus 200 uses the device information acquiring unit 62 to acquire the device information 81 in advance from the printer controller 21 of the printer PRN. Upon receiving an acquisition request from the server 300, the communication control apparatus 200 uses the device information transmitting unit 61 to transmit the acquired device information 81.

The device information 81 acquired by the printer information acquiring unit 54 is passed to the printer information managing unit 53c, which sets the values of the device information 81 to relevant setting items of the printer information 71c managed in the table format as shown in FIGS. 9A and 9B.

FIGS. 9A and 9B are drawings showing examples of the data configuration of the printer information 71c according to the first embodiment.

The communication control apparatus 200 of the present embodiment has the interface unit 205 to which a regular IP address or global IP address is assigned as was described in connection with its hardware configuration.

When a global IP address is assigned to an interface unit 205, such an assigned global IP address can be used to uniquely identify a printer PRN that has the communication control apparatus 200 connected thereto and is selectable as a printing apparatus.

In the case in which global IP addresses are specified, the printer information managing unit 53c manages various types of information for identifying each printer PRN connected to the image forming system 1 by using the printer information 71c as shown in FIG. 9A. The data contained in the printer information 71c shown in FIG. 9A includes three data entries, i.e., a network address, a printer model type ID, and printer configuration information, which are stored in the HDD 109 of the server 300 in a predetermined data format.

The printer information managing unit 53c uses the printer information acquiring unit 54 to acquire the device information 81 through the communication control apparatus 200 from the printer PRN connected to the image forming system 1. Upon acquiring the information, the printer information managing unit 53c sets a network address entry equal to the value of the global IP address assigned to the interface unit 205 of the communication control apparatus 200. Further, the printer information managing unit 53c sets the printer model type ID and printer configuration information contained in the device information 81 to relevant data entries.

When a regular (normal) IP address is assigned to an interface unit 205, the assigned IP address is only a local address, and, thus, cannot be used to uniquely identify a printer PRN that has the communication control apparatus 200 connected thereto and that is selectable as a printing apparatus.

In the case in which regular IP addresses are specified, the printer information managing unit 53c manages various types of information for identifying each printer PRN connected to the image forming system 1 by using the printer information 71c as shown in FIG. 9B. The data contained in the printer information 71c shown in FIG. 9B includes four data entries, i.e., a network address, a printer identification ID, a printer model type ID, and printer configuration information, which are stored in the HDD 109 of the server 300 in a predetermined data format. In the data example shown in FIG. 9B, a printer identification ID is used as information for identifying each printer PRN in place of a global IP address that is used to identify each printer PRN in FIG. 9A.

The printer information managing unit 53c uses the printer information acquiring unit 54 to acquire the device information 81 through the communication control apparatus 200 from the printer PRN connected to the image forming system 1. Upon acquiring the information, the printer information managing unit 53c sets a network address entry equal to the value of the IP address assigned to the interface unit 205. Further, the printer information managing unit 53c sets the printer identification ID, the printer model type ID and printer configuration information contained in the device information 81 to relevant data entries.

With the data configuration described above, a printer PRN selected as a printing apparatus can be selected from the printers PRN that are registered in the server 300 as selectable printing apparatuses based on a printer identification ID or global IP address assigned to the printer PRN that is selected as a printing apparatus. Upon identifying the printer PRN, the relevant network address, printer model type ID and printer configuration information can also be identified.

When the printer information 71c has data entries as shown in FIG. 9A, for example, the printer PRN equipped with a duplex unit having the printer model type ID "abc1234" is identified based on the network address (global IP address) "123:2345:90:ab:cdef::3494:0076". When the printer information 71c has data entries as shown in FIG. 9B, for example, the printer PRN equipped with a duplex unit having the printer model type ID "abc1234" and the network address (IP address) "192.168.8.76" is identified based on the printer identification ID "12345678a".

A table format is used as a data format example in FIGS. 9A and 9B. The present invention is not limited to such an example. It suffices for a data format to be configured such that some information for identifying each printer PRN is associated with the printers PRN provided in the image forming system 1.

<<<Method of Acquiring Device Information from Printer>>>

In the following, a more detailed description will be given of the method of acquiring the device information 81 from a printer PRN described above.

The communication control apparatus 200 of the present embodiment uses the device information acquiring unit 62 to request for the device information 81 by issuing a predetermined PJL (Printer Job Language) command or an MIB (Management Information Base) information request to the printer controller 21 of the printer PRN connected through the interface unit 206.

Upon receiving such a request, the printer controller 21 of the printer PRN collects the device information 81, and transmits the collected device information 81 to the communication control apparatus 200 that has requested the information.

The device information 81 (e.g., the scope of the device information 81) may differ between the self-manufactured printer PRNn and another company's printer PRNa. In consideration of this, the printer information managing unit 53c of the server 300 registers the printer information 71c based on the device information 81 as acquired from each printer PRN.

(1) Method of Acquiring Device Information from Self-Manufactured Printer

When acquiring device information 81 from a self-manufactured printer PRNn by issuing an MIB information request, for example, the communication control apparatus 200 uses the device information acquiring unit 62 to acquire only a predetermined range of information among the entire range of MIB information.

The MIB information that the communication control apparatus 200 can acquire from the self-manufactured printer PRNn includes standard acquirable information (i.e., public information) that can be acquired by issuing a request, such information including information for identifying a device (i.e., device ID or serial number equivalent to the printer identification ID described above), information for identifying a model (i.e., model type ID or device model name equivalent to the printer model type ID described above), information about an available function (e.g., print sorting indication equivalent to the printer configuration information described above). Further, information about available functions may include manufacture-specific information (private information) such as information about detailed operating conditions (e.g., types of print sorting such as rotation sorting or shift sorting). The range of information that the device information acquiring unit 62 acquires is determined in advance among the acquirable information described above.

When acquiring device information 81 from the self-manufactured printer PRNn by issuing a PJL command, for example, the communication control apparatus 200 acquires only a predetermined range of information similarly to the manner in which the MIB information is acquired. A range of information that can be acquired by issuing a PJL command is not as strictly defined as in the case of MIB information. In any event, such acquirable information may include standard acquirable information and manufacture-specific information. The range of information that is acquired by the device information acquiring unit 62 is determined in advance among the above-noted acquirable information.

In this manner, the range of information that is acquired by the communication control apparatus 200 from the self-manufactured printer PRNn is determined in advance, and only such a range of information is acquired from the self-manufactured printer PRNn.

The device information 81 acquired in such a manner is transmitted from the communication control apparatus 200 to the server 300, and is then passed to the printer information managing unit 53c.

(2) Method of Acquiring Device Information from Another Company's Printer

Unlike the case of the self-manufactured printer PRNn, manufacture-specific information (i.e., private information) cannot be acquired in the case of another company's printer PRNa.

When acquiring device information 81 from another company's printer PRNa by issuing an MIB information request or PJL command, therefore, the communication control apparatus 200 only acquires standard acquirable information that can normally be acquired regardless of which company has manufactured the printer.

In the case of MIB information, the manufacturer-specific information that cannot be acquired includes information about detailed operating conditions regarding available functions. Such information is not the type of information necessary for uniquely identifying a printer driver PD (such as printer identification ID or printer model type ID).

The communication control apparatus 200 uses the device information acquiring unit 62 to request another company's printer PRNa to provide the predetermined range of information. The communication control apparatus 200 transmits the standard acquirable information obtained by issuing the request to the server 300 as the device information 81, which is then passed to the printer information managing unit 53c.

The manufacturer-specific information that cannot be acquired is a type of information that would otherwise be used in exclusion control, such as print conditions set by a user at the time of printing after a printer driver PD corresponding to the printer PRN selected as a printing apparatus is selected at the server 300. In the case of a printer PRN that can perform rotation sorting depending on the orientation of a paper sheet supplied from a paper feed tray, for example, rotation shorting can only be performed when a paper feed tray for feeding paper sheets in a LEF (Long Edge Feed) orientation and a paper feed tray for feeding paper sheets in a SEF (Short Edge Feed) orientation are both used for the same size of paper sheets. Whether a user can specify a rotation sorting mode that is settable through the printer driver PD is dependent on whether the above-specified conditions are satisfied. Because of this, the conditions for the rotation sorting function settable through the printer driver PD is subjected to exclusive control, depending on whether the conditions for using the function are satisfied (i.e., the printer driver PD disables the setting if the conditions are not satisfied).

The server 300 of the present embodiment cannot perform exclusive control. In consideration of this, all the settings available for specifying print conditions through the printer driver PD are presented to the user as if the conditions required to use the functions were satisfied. In this manner, the exclusive control regarding print conditions is not performed by the printer driver PD, but is performed by the printer PRN after the print data is transmitted to the printer PRN. That is, the printer PRN performs printing by ignoring specified print conditions if it is not possible to perform an operation as requested by the specified print conditions.

The image forming system 1 of the present embodiment can flexibly cope with a change in system environment since the device information acquiring unit 62 of the communication control apparatus 200, the printer information managing unit 53c of the server 300, and the printer driver PD perform their respective parts in acquiring the device information 81 from the self-manufactured printer PRNn as follows:

device information acquiring unit 62: acquiring device information 81 from the printer PRN;

printer information managing unit 53c: decoding device information 81 for registration as printer information 71c; and printer driver PD: checking functional configurations performable by the model for presentation to users.

Further, the image forming system 1 can flexibly cope with a change in system environment since the device information acquiring unit 62 of the communication control apparatus 200 and the printer information managing unit 53c of the server 300 perform their respective parts in acquiring the device information 81 from another company's printer PRNa as follows:

device information acquiring unit 62: acquiring device information 81 from the printer PRN;

printer information managing unit 53c: decoding device information 81 for registration as printer information 71c; and printer driver PD: presenting to users all the functional configurations performable by the model.

In the following, a more detailed description will be given of the method of acquiring the device information 81 from a printer PRN through the communication control apparatus 200 for registration at the server 300.

FIG. 10 is a sequence chart showing an example of the registration of printer information 71c through the communication control apparatus 200 according to the first embodiment. FIG. 10 shows an example of a registration process in which the communication control apparatus 200 acquires device information 81 from a printer PRN in advance, and transmits the device information 81 as a response to a request from the server 300.

As shown, in FIG. 10, the communication control apparatus 200 of the present embodiment uses the interface unit 205 to detect that it is connected to an electrical communication line, and then uses the device information acquiring unit 62 to request for the device information 81 by issuing a predetermined PJL command or a MIB information request to the printer controller 21 of the printer PRN connected through the interface unit 206 (step S101).

Upon receiving such a request, the printer controller 21 collects the device information 81 (step S102), and transmits the collected device information 81 to the communication control apparatus 200 that has requested the information (step S103).

The printer information acquiring unit 200 uses the device information acquiring unit 62 to acquire the device information 81 transmitted from the printers PRN. Taking into account the data entries of printer information 71c to be registered at the server 300, the device information acquiring unit 62 checks whether the printer information 71c can be made from the acquired device information 81 (i.e., whether the values of the data entries can be determined based on the device information 81). Data indicative of the check result is temporarily stored in the RAM 202 as an acquisition result. Thereafter, the device information acquiring unit 62 transfers the acquired device information 81 to the device information transmitting unit 61 (step S104).

Once data communication with the printer PRN through the communication control apparatus 200 is enabled, the server 300 uses the printer information acquiring unit 54 to request the communication control apparatus 200 to transmit the device information 81 (step S105).

Upon receiving such a request, the communication control apparatus 200 transmits the acquired device information 81 and the acquisition result to the server 300 that has requested the information (step S106).

The server 300 uses the printer information acquiring unit 54 to receive the device information 81 and the acquisition result transmitted from the communication control apparatus 200, and transfers the received device information 81 and acquisition result to the printer information managing unit 53c (step S107).

The printer information managing unit 53c of the server 300 instructs the UI unit 51 to notify of the acquisition result (step S108). The values of the device information 81 are then stored in predetermined storage areas of the HDD 109 for registration of the relevant data entries of the printer information 71c (step S109).

In the procedure from step S105 to step S107, the server 300 uses the printer information acquiring unit 54 to request the device information transmitting unit 61 to transmit information upon detecting that the communication control apparatus 200 is connected to an electrical communication line, and then uses the printer information acquiring unit 54 to receive the device information 81 acquired by the device information acquiring unit 62 when the device information 81 is transmitted by the device information transmitting unit 61 in response to the request. It should be noted that the present embodiment is not limited to such an arrangement. As an alternative acquisition method, the device information transmitting unit 61 may transmit the device information 81 acquired by the device information acquiring unit 62 upon the communication control apparatus 200 being connected to an electrical communication line.

As described above, the image forming system 1 of the present embodiment manages the printer information 71c at the server 300 by use of the functional units operating as described above, and can thus centrally manage and operate a plurality of printers PRN of different manufacturers (i.e., self-manufactured printers and another company's printers) provided in the image forming system 1 based on the same set of data.

<<Installing Printer Driver Corresponding to Printer>>

In the image forming system 1 of the present embodiment, an administrator, for example, installs a printer driver PD corresponding to a printer PRN in the server 300 in advance in accordance with the print services provided to users by the system. The installed printer driver PD is stored in a predetermined storage area of the HDD 109.

Figure 11:
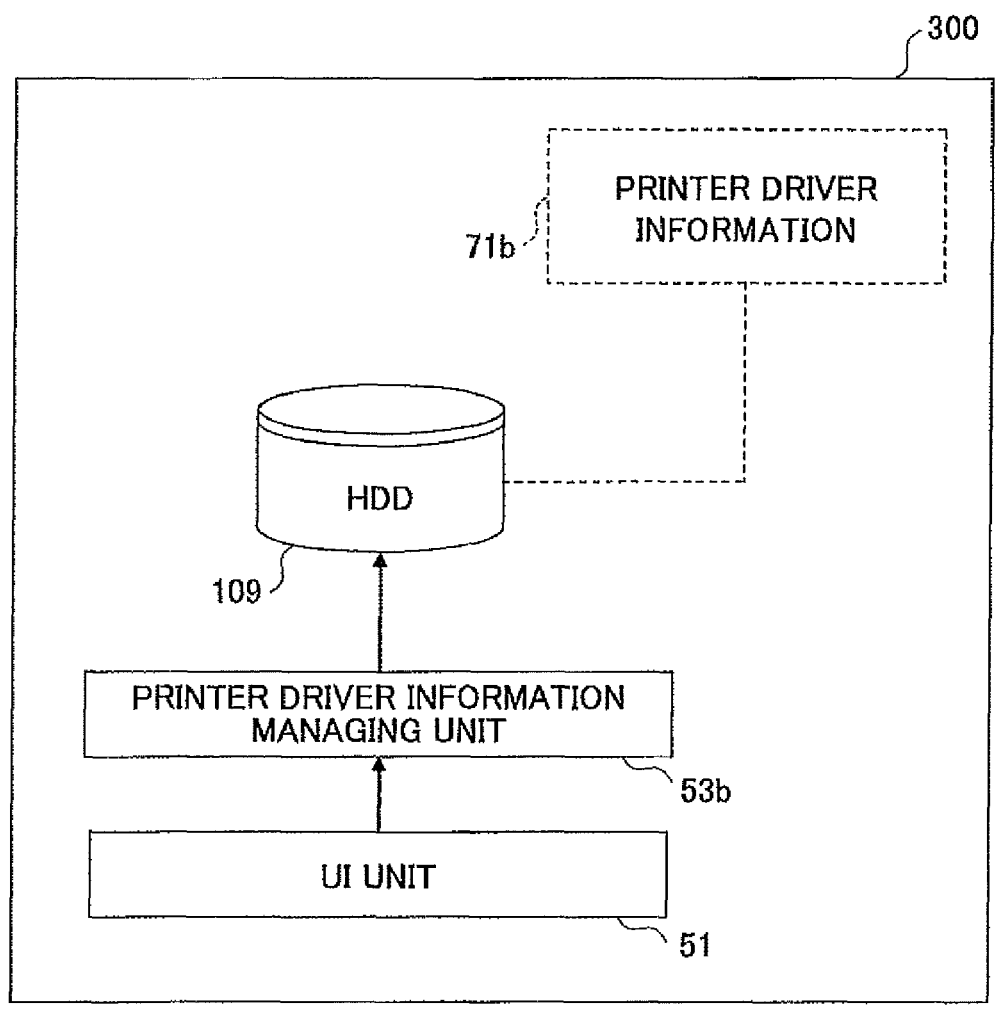
FIG. 11 is a drawing showing an example of the process of installing a printer driver according to the first embodiment.

When the printer driver PD is installed, the image forming system 1 uses the printer driver information managing unit 53b to register various types of information for managing the installed printer driver PD in the server 300, as shown in an example illustrated in FIG. 11.

FIG. 11 is a drawing showing an example of the process of installing a printer driver PD according to the first embodiment.

When a printer driver PD corresponding to a printer PRN is to be installed, as shown in FIG. 11, the server 300 receives a printer model type ID of the printer PRN, a name of the printer driver PD (hereinafter referred to as "printer driver name"), and a version of the printer driver PD through the UI unit 51 as they are entered by an administrator. The received data is passed to the printer driver information managing unit 53b for registration at a management table.

The printer driver information managing unit 53b sets relevant data entries of the printer driver information 71b managed in a table format as shown in FIG. 12 by setting these entries equal to the values specified by the information received from the UI unit 51.

FIG. 12 is a drawing showing an example of the data configuration of the printer driver information 71b according to the first embodiment. As shown in FIG. 12, the data contained in the printer driver information 71b includes three data entries, i.e., a printer model type ID, a printer driver name, and a version number, which are stored in the HDD 109 of the server 300 in a predetermined data format.

With such a data configuration, a printer driver PD for generating proper print data can be selected from a plurality of printer drivers PD installed in the server 300 in response to the model type ID of the printer PRN selected as a printing apparatus.

The printer driver information 71b may have values as shown in FIG. 12, for example. In such a case, a printer driver PD having the printer driver name "Y-company printer driver A" and the version number "1.02" can be identified in response to the printer model type ID "abc1234".

A table format is used as a data format example in FIG. 12. The present invention is not limited to such an example. Printer drivers PD are generally provided in one-to-one correspondence to model types when considering product variations of printers PRN. A data format may thus be configured such that information for identifying each printer driver PD is associated with a corresponding model type.

For the purpose of installing a printer driver PDn corresponding to a self-manufactured printer PRNn, the server 300 may regularly access an in-house download server that stores printer drivers PDn. When there is a printer driver PDn that needs to be updated or added as a new driver, the server 300 may automatically download and install such a printer driver PDn. An installer (i.e., installation program) executed at the server 300 includes a software component for requesting that the printer driver information 71b be registered. When the installation is performed, this software component is automatically activated so that setting values corresponding to the data entries kept in advance inside the software component are passed to the printer driver information managing unit 53b together with an instruction to register the data entries.

As described above, the image forming system 1 of the present embodiment manages the printer driver information 71b at the server 300 by use of the functional units operating as described above, and can thus centrally manage and operate a plurality of printer drivers PD corresponding to a plurality of printers PRN of different manufacturers (i.e., self-manufactured printers and another company's printers) installed in the image forming system 1 based on the same set of data. Prior to the installation of a printer driver PD, the UI unit 51 is used to present a list of already installed printer drivers PD on the display unit 102 based on the printer driver information 71b managed at the server 300. With this arrangement, an administrator and/or user can readily confirm whether the printer driver PD intended to be installed has already been installed.

The printer information 71c and the printer driver information 71b include a printer model type ID (i.e., information for identifying a model type) as a common data entry. When a user specifies a printing apparatus by use of a global IP address or a printer identification ID, thus, the functional units operating at the server 300 as described above can identify the printer PRN selected as the printing apparatus and the printer driver PD corresponding to this printer PRN.

<<Registration of Printers Selectable by User>>

In the image forming system 1 of the present embodiment, the UI unit 51 provides a UI function that is used by a user to make various printer settings for controlling an image forming operation. The settings that can be specified by a user through the UI function includes a global IP address or printer identification ID serving as printer identifying information for identifying a printing apparatus. The UI unit 51 displays a list of printer identifying information selectable by a user (hereinafter referred to as "selectable printer identifying information") on the display unit 102 of a user terminal such as the client 100 or client 400.

In order to achieve the operation as described above, the selectable printer identifying information for which the UI unit 51 displays a list of candidates needs to be managed. To this end, the server 300 of the image forming system 1 manages the selectable printer identifying information by use of a data format as shown in FIG. 14.

Figure 13:
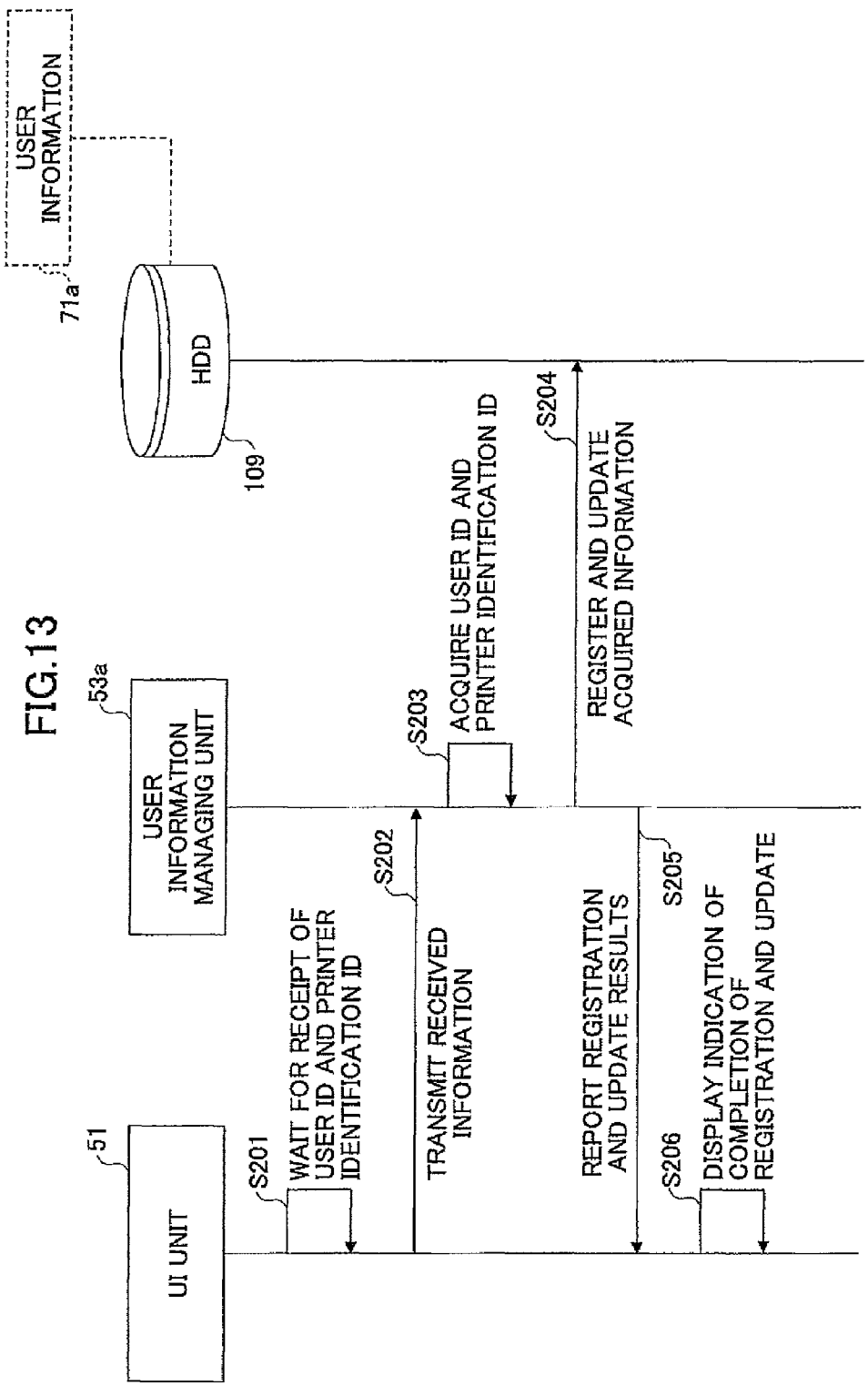
FIG. 13 is a drawing showing an example of the process of registering selectable printer identifying information on a user-specific basis according to the first embodiment.

In the image forming system 1 of the present embodiment, the methods for registering selectable printer identifying information managed by the server 300 include a method of registering a global IP address or printer identification ID entered through the UI function as selectable printer identifying information as shown in an example of a registration process in FIG. 13, for example. Further, there is also a method of registering selectable printer identifying information based on search results that are obtained by searching a printer PRN by use of a predetermined search condition value as a query key as shown in an example of a registration process in FIG. 15. In the following, these two registration methods will be described.

<<<Registration of Selectable Printer Identifying Information Directly Entered through UI>>>

FIG. 13 is a drawing showing an example of the process of registering selectable printer identifying information on a user-specific basis according to the first embodiment. FIG. 13 shows an example of a registration process in which the printer identifying information entered through the UI function is a printer identification ID.

As shown in FIG. 13, the server 300 of the present embodiment waits for values for data entries to be entered after the UI unit 51 enables a UI function that is usable to enter a user ID for identifying a user and a printer identification ID as the above-noted data entries (step S201).

Upon receiving values of these data entries through the UI unit 51, the server 300 passes the values of the user ID and the printer identification ID to the user information managing unit 53*a* (step S202).

When the user information managing unit 53*a* receives the values of the user ID and the printer identification ID (step S203), the values of these data entries are registered as relevant data entries of the user information 71*a* stored in a predetermined storage area of the HDD 109 as information updating (step S204).

FIG. 14 is a drawing showing an example of the data configuration of the user information 71*a* according to the first embodiment. The server 300 manages selectable printer identifying information by use of the user information 71*a* having a table format as shown in FIG. 14, for example. The data contained in the user information 71*a* shown in FIG. 14 includes three data entries, i.e., a user ID, a registered printer identification ID list, and a selected printer identification ID, which are stored in the HDD 109 of the server 300 in a predetermined data format.

With such a data configuration, selectable printer identifying information associated with a given user under management by server 300 can be identified in response to a user ID.

The user information 71*a* may have values as shown in FIG. 14, for example. In such a case, the printer identification IDs "12345678a" and "123456789b" can be identified as printer identifying information for identifying printing apparatuses selectable by a user in response to the user ID "user01@abc.bb.cc".

In view of the data configuration of user information 71*a* as described above, a more detailed description will be given of the above-described registration process performed in step S204.

The user information managing unit 53*a* uses an obtained user ID as a query key to search for user information 71*a*, and checks based on the search results whether the user having requested to register printer identifying information is already registered in the user information 71*a*.

If the search results indicate that the user is already registered, the user information managing unit 53*a* searches in the data entries of the registered printer identification IDs associated with the user by using the obtained printer identification ID as a query key. Based on this search result, the user information managing unit 53*a* checks whether the printer identification ID to be registered is already registered. If the search result indicates that it has not yet been registered, the registration process to register the obtained printer identification ID is performed, followed by also registering as a data entry of the selected printer identification ID the value of the printer identification ID that has just been registered.

If the search result indicates that the user has not yet been registered in the user information 71*a*, the user information managing unit 53*a* creates a new user data area for the user information 71*a*, followed by registering the obtained values of the user ID and the printer identification ID in the relevant data entries. As in the previous case, the value of the printer identification ID that has just been registered as a data entry of the registered printer identification ID is also registered as a data entry of the selected printer identification ID.

With the user information managing unit 53*a* performing the process of step S204 as described above, the server 300 registers selectable printer identifying information in the user information 71*a*.

The server 300 uses the user information managing unit 53*a* to notify the UI unit 51 of results of the registration of selectable printer identifying information and the updating of the user information 71*a* (step S205). In response, the UI unit 51 displays the results of the registration and updating processes (step S206).

<<<Registration of Selectable Printer Identifying Information Based on Search Result>>>

In the image forming system 1 of the present embodiment, a user does not necessarily know the value of a global IP address or printer identification ID serving as printer identifying information. In consideration of this, the function to extract a predetermined number of printer identifying information items by use of a search query is provided.

Figure 15:
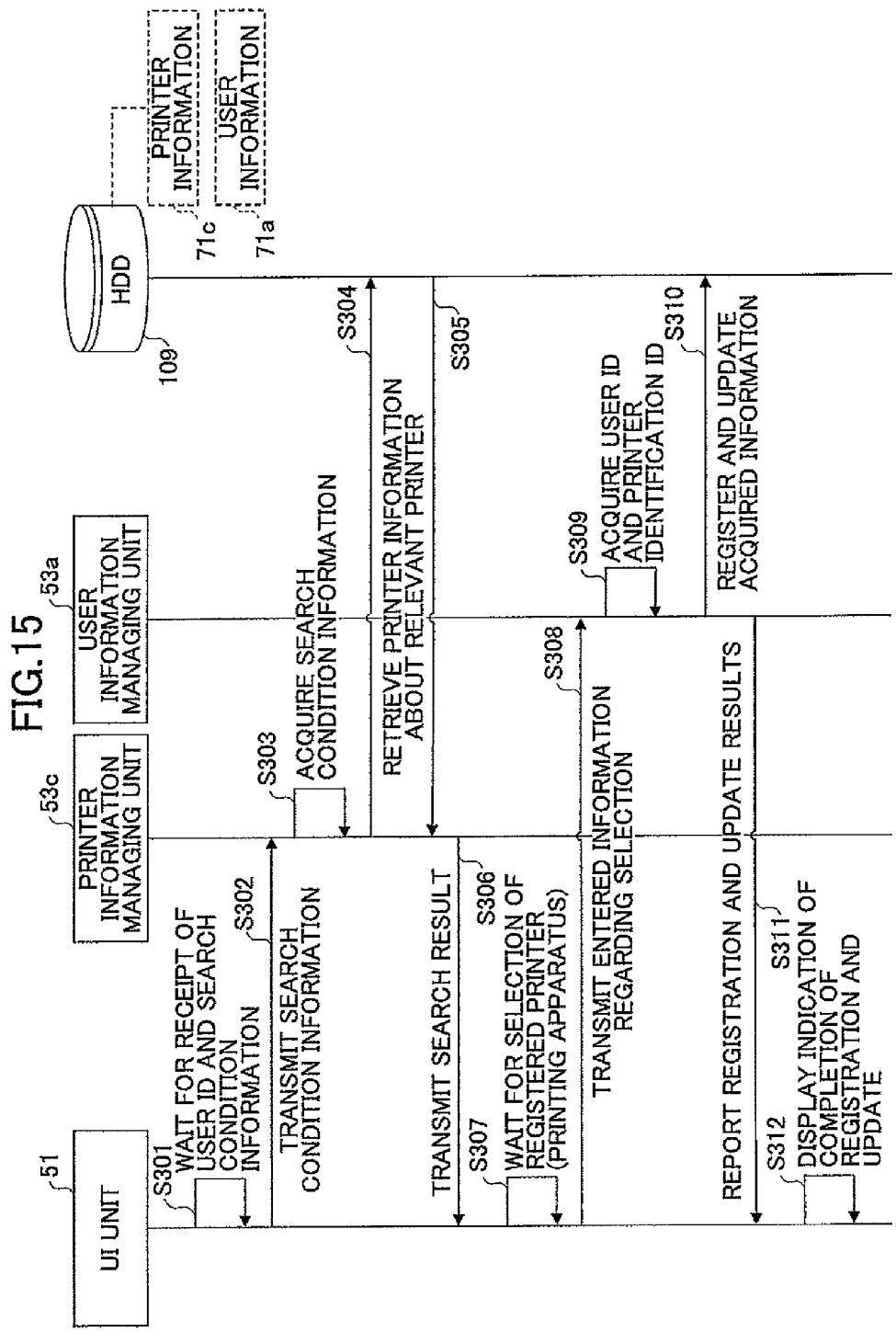
FIG. 15 is a drawing showing an example of the process of registering selectable printer identifying information on a user-specific basis according to the first embodiment.

FIG. 15 is a drawing showing an example of the process of registering selectable printer identifying information on a user-specific basis according to the first embodiment. As in FIG. 13, FIG. 15 shows an example of a registration process in which the printer identifying information selected through the UI function is a printer identification ID.

As shown in FIG. 15, the server 300 of the present embodiment waits for values for data items to be entered after the UI unit 51 enables a UI function that is usable to enter configuration information regarding a printer configuration such as "duplex unit" and "large-volume paper feed tray", predetermined search conditions such as a printer model type ID, and a user ID as the above-noted data items (step S301).

Upon receiving values of these data items through the UI unit 51, the server 300 passes the values of the entered search conditions to the printer information managing unit 53c (step S302).

When the printer information managing unit 53c receives the values of the search conditions (step S303), these received search condition values are used as a query key to search in the data entries of the printer information 71c stored in a predetermined storage area of the HDD 109 (step S304). The values of printer identification IDs corresponding to one or more printers that are located in the search among the printers registered in the printer information 71c are retrieved as search results (step S305).

Upon receiving the search results through the printer information managing unit 53c, the server 300 passes the values of the printer identification IDs obtained as the search results to the UI unit 51 (step S306).

The server 300 waits for some of the data items to be selected after the UI unit 51 enables a UI function that is usable to select printer identifying information to be registered among the list of printer identification IDs shown as printer identifying information candidates (step S307).

Upon receiving the value of the data item through the UI unit 51, the server 300 passes the value of the user ID as entered in step S301 and the value of the received printer identification ID to the user information managing unit 53a (step S308).

When the user information managing unit 53a receives the values of the user ID and the printer identification ID (step S309), the values of these data entries are registered as relevant data entries of the user information 71a stored in a predetermined storage area of the HDD 109 as information updating (step S310).

The server 300 uses the user information managing unit 53a to notify the UI unit 51 of results of the registration of selectable printer identifying information and the updating of the user information 71a (step S311). In response, the UI unit 51 displays the results of the registration and updating processes (step S312).

Through the procedure described above, the image forming system 1 of the present embodiment can register selectable printer identifying information on a user-specific basis to manage and operate the registered information at the server 300.

<<Selecting Printer Driver According to Indication of Printing Apparatus and Setting Destination of Data Transmission (Network Address)>>

In the image forming system 1 of the present embodiment, the method as described above is employed to set and register various types of information (hereinafter referred to as "operation control setting information") for controlling an image forming operation at the server 300 for central management.

The image forming system 1 selects a proper printer driver PD from a plurality of installed printer drivers PD such that the selected printer driver PD matches the printer PRN selected as a printing apparatus. The selected printer driver PD is used to generate print data, which is then transmitted to a network address specified as the destination of data transmission. This achieves an image forming operation as desired by a user.

To this end, the image forming system 1 performs the selecting of a printer driver PD to be used in an image forming operation and the setting of a network address serving as an indication of a destination based on various setting information (i.e., the user information 71a, the printer driver information 71b, and the printer information 71c) as have been described heretofore. In the following, a description will be given of how the image forming system 1 performs the above procedure based on the operation control setting information.

Figure 16:
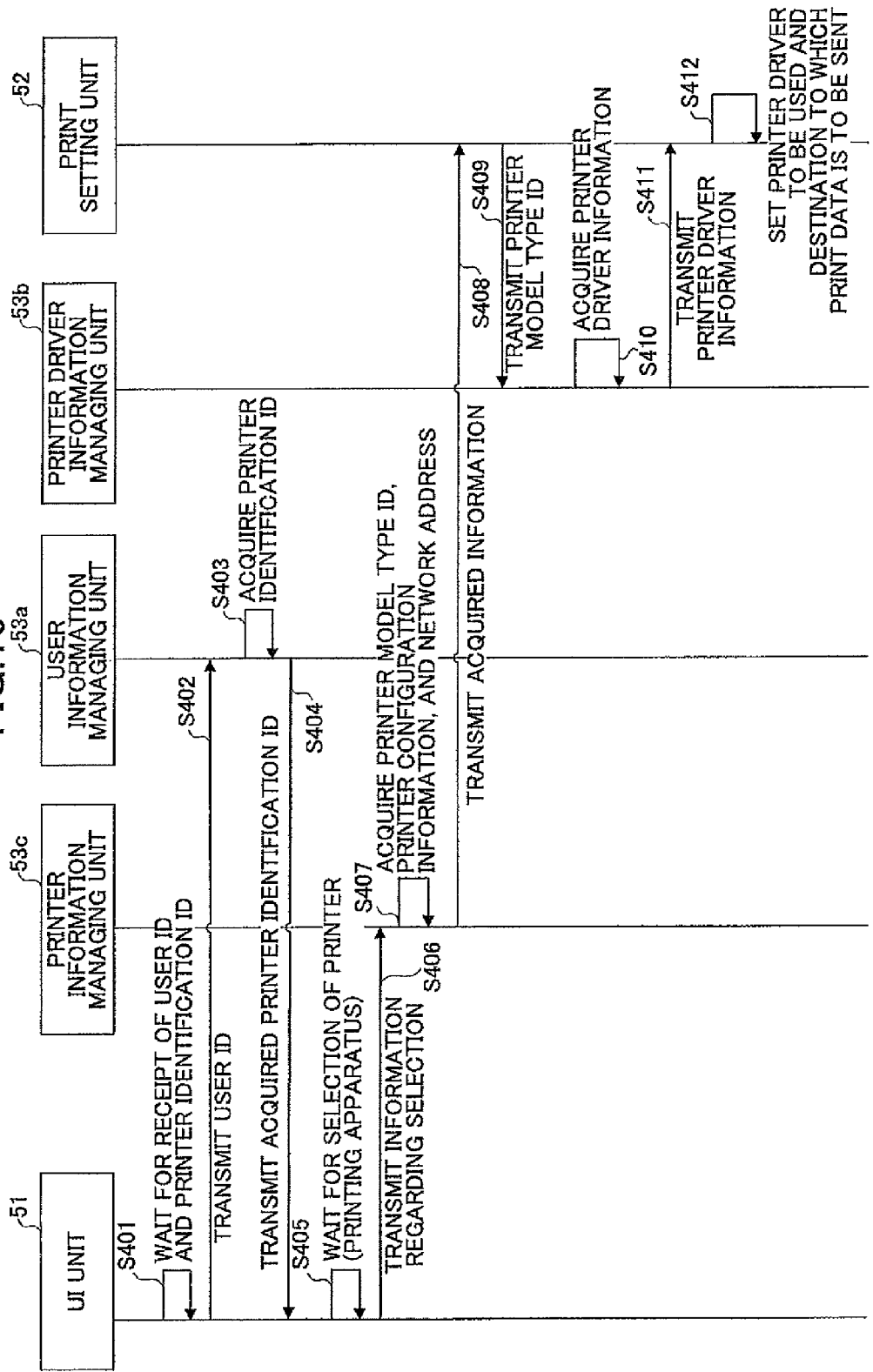
FIG. 16 is a sequence chart showing an example of the process of selecting a printer driver and the process of setting destination information indicative of a destination of generated data according to the first embodiment.

FIG. 16 is a sequence chart showing an example of the process of selecting a printer driver PD and the process of setting destination information (i.e., network address) indicative of a destination of generated data according to the first embodiment. FIG. 16 shows an example of a setting process in which the printer identifying information entered through the UI function is a printer identification ID.

As shown in FIG. 16, the server 300 of the present embodiment waits for values for data entries to be entered after the UI unit 51 enables a UI function that is usable to enter a user ID for identifying a user and a printer identification ID as the above-noted data entries (step S401).

Upon receiving values of these data items through the UI unit 51, the server 300 passes the value of the user ID to the user information managing unit 53a (step S402).

When the user information managing unit 53a receives the value of the user ID, the server 300 uses the value of the user ID to refer to the user information 71a stored in a predetermined storage area of the HDD 109, and acquires one or more printer identification IDs registered as the selectable printer identifying information associated with the user ID (step S403).

Upon receiving the values of the printer identification IDs through the user information managing unit 53a, the server 300 passes the obtained values of the printer identification IDs to the UI unit 51 (step S404).

The server 300 waits for some of the data items to be selected after the UI unit 51 enables a UI function that is usable to select printer identifying information among the list of printer identification IDs shown as printer identifying information candidates (step S405).

Upon receiving the value of a selected data item through the UI unit 51, the server 300 passes the value of the selected printer identification ID to the printer information managing unit 53c (step S406).

When the user information managing unit 53a receives the value of the printer identification ID, the server 300 uses the value of the printer identification ID to refer to the printer information 71c stored in a predetermined storage area of the HDD 109, and acquires the values of a network address, a printer model type ID, and a printer configuration information registered and associated with the printer identification ID (step S407).

Upon receiving the values of a network address, a printer model type ID, and printer configuration information through the printer information managing unit 53c, the server 300 passes the obtained values of a printer model type ID and printer configuration information to the print setting unit 52 (step S408).

The print setting unit 52 passes the value of the printer model type ID to the printer driver information managing unit 53b (step S409). Based on the received value of the printer model type ID, the printer driver information managing unit 53b refers to the printer driver information 71b stored in a predetermined area of the HDD 109 to acquire data values indicative of a printer driver name and a version number associated with the printer model type ID (step S410).

Upon receiving the values of the printer driver name and the version number through the printer driver information managing unit 53b, the server 300 passes the obtained values of the printer driver name and the version number to the print setting unit 52 (step S411).

Based on the values of the printer driver name and the version number, the print setting unit 52 of the server 300 selects a printer driver PD to be used for an image forming operation among the printer drivers PD installed in the server 300, followed by setting the selected printer driver PD to the control parameters. Further, the print setting unit 52 sets the network address obtained in step S408 to the control parameters as an indication of destination of print data transmission (S412).

In this manner, the image forming system 1 of the present embodiment performs the selecting and setting of a printer driver PD corresponding to the printer PRN selected as a printing apparatus and the setting of a destination of print data transmission for the purpose of achieving an image forming operation as requested by a user.

In the image forming system 1, the printer driver information 71b and the printer information 71c managed by the setting management module 12 of the server 300 are used to configure an image forming operation environment that is user-friendlier than the related-art environment in the sense that all the printers PRN connected to the image forming system 1 can be utilized regardless of whether the printers PRN are self-manufactured products or other company's products.

<<Example of Procedure for Configuring Image Forming Operation Environment>>
(1) A network cable is connected to the data communication I/F unit 24 of a printer PRN.
(2) The data communication I/F unit 24 detects the network cable, and establishes connection with the server 300.
(3) Based on the printer identification ID acquired from the printer PRN, the server 300 selects a printer driver PD corresponding to the printer PRN (i.e., assigns the printer driver PD to the printer PRN).

With this arrangement, a print service is provided such that proper print data is generated upon receiving an indication of a printing apparatus from a user, and is printed through a specified printer PRN.

<Summary>

According to the first embodiment as described above, the image forming system 1 uses the server 300 to manage a plurality of printer drivers PD in such a manner that they are associated with printers PRN of different manufacturers provided in the image forming system 1

The server 300 of the image forming system 1 uses the operation control setting functions to make various settings for controlling an image forming operation with respect to the image forming functions provided in the image forming system 1.

An image forming operation that utilizes another company's printer PRN is performed in the environment in which self-manufactured printers PRN and other company's printers are provided in the system. The communication control apparatus 200 that acquires the device information 81 about a printer PRN and transmits the device information 81 to the server 300 is connected to another company's printer PRNa, thereby transmitting the device information 81 about such another company's printer PRNa to the server 300. Based on the device information 81, the printer information 71c including printer identification information and model-type identification information associated with each other is registered for the purpose of identifying printer PRN. When installing a printer driver PD, data entered through a UI function is used to register the printer driver information 71b including a name of the printer driver PD and corresponding model type identification information associated with each other for the purpose of identifying a printer driver PD.

Through information management as described above, the server 300 of the present embodiment receives a print request (including printer identification information) from a user, and selects a proper printer driver PD corresponding to the printer PRN selected as a printing apparatus in response to the received print request among the managed printer drivers PD. The selected printer driver PD is used to generate print data from application data, and the generated print data is then transmitted to the printer PRN according to the network address, thereby performing a proper image forming operation.

In the image forming system 1 of the present embodiment, the communication control apparatus 200 is first connected to another company's printer PRNa. If a checking of printer drivers PD managed in the server 300 reveals that a required printer driver PD is already installed, a print service can be provided immediately. If such a required printer driver PD is not yet installed, the server 300 installs the required printer driver PD to start a print service.

In this manner, the image forming system 1 of the present embodiment manages and operates printers PRN of different manufacturers by using management data having a unified data configuration, thereby providing users with an image forming operation that can flexibly cope with a change in system environment such as an addition of a printer PRN made by another manufacturer.

Second Embodiment

With respect to the first embodiment, a description has been given of the configuration in which the device information 81 used by the printer information managing unit 53c to register the printer information 71c is acquired by attaching the communication control apparatus 200 to another company's or self-manufactured printer PRN. Such a configuration is viable when there is an agreed method for acquiring information.

The printers PRN connected to the image forming system 1 may include a printer PRN that does not conform to such an agreed method used by the device information acquiring unit 62 of the communication control apparatus 200 (i.e., another method is required to acquire information).

For example, another company's printer PRNa may be configured to return Web-based data defined in one's own style by using XML.

In the case of a self-manufactured printer PRNn for which a new acquisition method is used to acquire the device information 81, this printer can be customized to also conform to the existing acquisition method such that the device information 81 can be acquired without modifying the device information acquiring unit 62 of the communication control apparatus 200. In the case of another company's printer PRNa, however, such customization cannot be made.

In the image forming system 1 of this embodiment, an administrator creates in advance a script (hereinafter referred to as "device information acquisition script") that describes a procedure for acquiring device information according to an acquisition method of a printer PRN, for which device information can only be acquired by use of this acquisition method. When a printer driver PD is installed in the server 300, the device information acquisition script is also installed in such a manner that it is associated with the printer driver PD.

With this provision, the server 300 identifies a device information acquisition script installed therein that corresponds to a printer model type ID specified by an administrator when the acquisition method performed by the device information acquiring unit 62 of the communication control apparatus 200 fails to obtain the device information 81 from the printer PRN in the image forming system 1. The identified device information acquisition script is transmitted to the communication control apparatus 200, which then executes the device information acquisition script to acquire the device information 81 from the printer PRN.

In the following, a more detailed description will be given of the device information acquisition method of the image forming system 1 of the present embodiment. The functional configurations and data configurations for achieving the above-described functions in the image forming system 1 are the same as those of the first embodiment, and are referred to by the same numerals without a duplicate description thereof. Only a portion that differs from the first embodiment will be described in the following.

<Management of Device Information Acquisition Script at Server>

In the first embodiment, FIG. 11 is used to describe "Installing Printer Driver Corresponding to Printer". Similarly to the manner shown in FIG. 11, the image forming system 1 of the present embodiment uses the printer driver information managing unit 53b to register various types of information for managing the installed printer driver PD in the server 300.

When a printer driver PD corresponding to a printer PRN is to be installed, the server 300 receives a printer model type ID of the printer PRN, a name of the printer driver PD (hereinafter referred to as "printer driver name"), and a version of the printer driver PD through the UI unit 51 as they are entered by an administrator. The received data is passed to the printer driver information managing unit 53b for registration at a management table. In so doing, the server 300 uses the UI unit 51 to receive information identifying the device information acquisition script of the printer PRN corresponding to the printer driver PD that is about to be registered The received information is also passed to the printer driver information managing unit 53b.

The printer driver information managing unit 53b sets relevant data entries of the printer driver information 71b managed in a table format as shown in FIG. 17 by setting these entries equal to the values specified by the information received from the UI unit 51.

FIG. 17 is a drawing showing an example of the data configuration of the printer driver information 71b according to the second embodiment. As shown in FIG. 17, the data contained in the printer driver information 71b includes four data entries, i.e., a name of device information acquisition script in addition to a printer model type ID, a printer driver name, and a version number, which are stored in the HDD 109 of the server 300 in a predetermined data format.

With such data configuration, a device information acquisition script corresponding to a printer PRN can be identified among a plurality of device information acquisition scripts installed in the server 300 in response to the model type ID of the printer PRN selected as a printing apparatus.

In the image forming system 1 of the present embodiment, the server 300 manages device information acquisition scripts by use of a data configuration as shown in FIG. 17.

<Acquisition of Device Information by Using Device Information Acquisition Script>

In the following, a description will be given of a procedure by which a device information acquisition script is used to acquire device information 81 from a printer PRN in the image forming system 1 of the present embodiment.

FIG. 18 is a drawing showing an example of the procedure of acquiring device information 81 according to the second embodiment.

In the image forming system 1, the printer information acquiring unit 54 of the server 300 sends a request to acquire the device information 81 to the communication control apparatus 200 (step S501). In response to the request from the server 300, the device information acquiring unit 62 of the communication control apparatus 200 acquires the device information 81 from the printer PRN.

If the communication control apparatus 200 fails to obtain the device information 81, the device information transmitting unit 61 of the device information acquiring unit 200 sends a notice indicative of the failure to the server 300 (step S502).

The server 300 transfers the notice received from the communication control apparatus 200 to the printer information managing unit 53c (step S503), which checks the contents of the notice.

The printer information managing unit 53c of the server 300 requests the UI unit 51 to display a screen for receiving a printer model type ID (step S504). The UI unit 51 transfers the received printer model type ID to the requester (step S505).

In the server 300, the obtained printer model type ID is transferred from the printer information managing unit 53c to the printer driver information managing unit 53b (step S506). The printer driver information managing unit 53b refers to the printer driver information 71b stored in a predetermined storage area of the HDD 109 based on the printer model type ID (step S507).

As a result, the name of a relevant device information acquisition script is identified in the server 300, and the installed device information acquisition script is retrieved (step S508).

In the server 300, the acquired device information acquisition script is transferred from the printer driver information managing unit 53b to the printer information acquiring unit 54 through the printer information managing unit 53c (steps S509 and S510).

The printer information acquiring unit 300 uses the printer information acquiring unit 54 to transmit the device information acquisition script to the communication control apparatus 200 (step S511).

The device information acquiring unit 62 of the communication control apparatus 200 performs the received device information acquisition script to acquire the device information 81 from the printer PRN (step S512).

<Summary>

As described above, the image forming system 1 of the second embodiment can manage and operate a new model type printer PRN for which relevant information can be acquired only by use of a new acquisition method, and, for that purpose, can use the same management data as those used for other printers PRN that are already installed, without a need to modify the communication control apparatus 200 for acquiring device information 81 from a printer PRN. The second embodiment thus provides similar advantages to those of the first embodiment.

Third Embodiment

In the embodiments described above, the communication control apparatus 200 has the function to acquire device information 81 from a printer PRN, and the device information 81 acquired by the communication control apparatus 200 is transmitted to the server 300. In this manner, a plurality of apparatuses are involved for the management of printer information 71c.

In such a configuration, the server 300 cannot identify a printer driver PD corresponding to a printer PRN specified as a printing apparatus when a printer identification ID or a printer model type ID cannot be acquired from the printer PRN for some reason. Also, the complexity of such a configuration may require a lengthy time to identify the cause of trouble and its countermeasures, which imposes a heavy work load on the administrator.

In the image forming system 1 of the present embodiment, the number of functional units for achieving the function of the image forming system 1 is reduced to minimum as shown in FIG. 19. Specifically, the functional units for acquiring device information 81 as described in the previously-described embodiments are all consolidated in the server 300 to achieve a minimum configuration.

In the following, a more detailed description will be given of the functional configuration of the image forming system 1 of the present embodiment. The functional configurations and data configurations for achieving the above-described functions in the image forming system 1 are the same as those of the previously-described embodiments, and are referred to by the same numerals without a duplicate description thereof. Only a portion that differs from the previously-described embodiments will be described in the following.

<Functional Configuration>

FIG. 19 is a drawing showing an example of the functional configuration of the image forming system 1 according to the third embodiment.

As can be seen from FIG. 19, the image forming system 1 of the present embodiment is provided with a GUI (Graphical Use Interface) function of the UI unit 51 that is used on the display unit 102 to receive predetermined information from a user. Various types of information managed and operated by the server 300 are entered through this GUI function.

In the image forming system 1, thus, there is no need to acquire device information 81 from a printer PRN by use of the communication control apparatus 200. Because of this, the apparatus information transmitting module 32 is nonexistent in the communication control apparatus 200, and the printer information acquiring unit 54 provided by the setting management module 12 is also nonexistent in the server 300.

With this configuration, a user can install a printer driver PD corresponding to a printer PRN, and can set the user information 71a, the printer driver information 71b, and the printer information 71c, which was a task of an administrator in the previously-described embodiments. When a user installs a printer driver PDa corresponding to another company's printer PRNa, the printer driver information managing unit 53b checks based on the entered printer driver information 71b whether the printer driver PDa is already installed.

If it is ascertained that the printer driver PDa is already installed, only the user information 71a entered through the UI screen is used to register the user information 71a.

If it is ascertained that the printer driver PDa is not yet installed (i.e., no relevant information is found in database), the printer driver PDa that has been downloaded to a user terminal such as the client 100 is uploaded to the server 300 through the UI screen provided by the UI unit 51 when the user terminal accesses the server 300. On the UI screen, then, an instruction to install the printer driver PDa uploaded to the server 300 is entered, and, also, the entered data values of the user information 71a, the printer driver information 71b, and the printer information 71c are transmitted to the server 300.

<Summary>

According to the third embodiment as described above, the image forming system 1 uses a minimum functional configuration to manage a plurality of printers PRN of different manufacturers by use of management data having the same data configuration, thereby providing similar advantages to those of the first embodiment.

The embodiments have been described heretofore for the purpose of illustrating the present invention. The image forming function of the image forming system 1 of these embodiments may be implemented as computer-executed programs for performing the steps of the procedures as described. Such programs are coded in program languages suitable for the operating environments (i.e., platforms) that may be the server 300 (management apparatus) and the communication control apparatus 200, which are parts of the image forming system 1. Image forming programs and communication control programs for achieving the image forming system 1 of the embodiments may be stored in the computer-readable recording medium 104.

The image forming programs that are stored in the recording medium 104 such as a floppy disk (registered trademark), CD (Compact Disc), or DVD (Digital Versatile Disk) are installed to the server 300 constituting the image forming system 1 when the recording medium 104 is mounted to the driver unit 103 that can read the recording medium 104. The server 300 and the communication control apparatus 200 have the interface units 108 and 205, respectively. With such configuration, the image forming programs and communication control programs may be downloaded and installed through electrical communication lines such as the Internet.

Further, the embodiments have been described with respect to the procedure that is triggered by an indication of a printer identification ID specified by use of the UI function of the UI unit 51. Alternatively, a global IP address may be specified as shown in the printer information 71c of FIG. 9A. Any information that can uniquely identify a printer PRN managed and operated by the image forming system 1 may be used for the identification purpose. The user information 71a of FIG. 14 has a data configuration that includes a user ID and a printer identification ID. Alternatively, a data configuration that includes a user ID and a global IP address may be used. In this manner, the disclosures provided heretofore are not intended to limit the scope of the invention.

Further, the present invention is not limited to these embodiments, but various variations and modifications may be made without departing from the scope of the present invention.

The present invention may include the following configurations in addition to what is specified in the claims.

A communication control apparatus for controlling data communication between a management apparatus for managing and operating an image forming system and an image forming apparatus for forming an image on an image forming medium in response to print data transmitted from the management apparatus may include:

a device information acquisition unit configured to acquire device information from the image forming apparatus connected through a predetermined interface, and a transfer unit configured to transfer the print data transmitted from the management apparatus to the image forming apparatus connected through the predetermined interface.

The communication control apparatus as specified above may further include a device information transmitting unit configured to transmit to the management apparatus the device information acquired by the device information acquisition unit.

The communication control apparatus as specified above may further include a communication device having a global IP address assigned thereto, wherein data communication between the communication control apparatus and the management apparatus is performed by use of the global IP address.

A method of forming an image in an image forming system, in which a management apparatus for managing and operating the image forming system receives a print request from an information processing apparatus, and sends an image forming request to an image forming apparatus selected according to the print request as a printing apparatus through a communication control apparatus for controlling data communication between the management apparatus and the image forming apparatus, the image forming request requesting to perform a predetermined image forming operation, may include:

a software component storing step of storing one or more software components in a predetermined storage area of a storage device of the management apparatus, the one or more software components being each configured to generate print data recognizable by a corresponding image forming apparatus;

a selecting step of selecting a software component from the one or more software components stored in the storage device by the software component storing step in response to the print request, the selected software component being used to generate print data corresponding to the image forming apparatus selected as a printing apparatus; and a transmission step of transmitting the print data generated by the selected software component selected by the selecting step to the image forming apparatus selected as a printing apparatus through the communication control apparatus.

The present application is based on Japanese priority application No. 2008-030931 filed on Feb. 12, 2008, with the Japanese Patent Office, the entire contents of which are hereby incorporated by reference.

What is claimed is:

1. An image forming system, comprising:
a plurality of image forming apparatuses;
a management apparatus configured to manage and operate the image forming system; and
a plurality of communication control apparatuses each configured to control data communication between the management apparatus and a corresponding image forming apparatus,
wherein the management apparatus is configured to receive a print request from an information processing apparatus and configured to send an image forming request to an image forming apparatus selected according to the print request as a printing apparatus through a corresponding communication control apparatus, the image forming request requesting to perform a predetermined image forming operation, and
wherein the management apparatus includes:
a software component storing unit configured to store one or more software components in a predetermined storage area of a storage device of the management apparatus, the one or more software components being each configured to generate print data recognizable by a corresponding image forming apparatus;
a selecting unit configured to select a software component from the one or more software components stored in the storage device by the software component storing unit in response to the print request, the selected software component being used to generate print data corresponding to the image forming apparatus selected as a printing apparatus; and
a transmission unit configured to transmit the print data generated by the selected software component selected by the selecting unit to the image forming apparatus selected as a printing apparatus through the corresponding communication control apparatus, and wherein each of the one or more software components is a printer driver of the corresponding image forming apparatus and located only in the management apparatus so that the information processing apparatus does not include the printer driver, and the management apparatus is configured to acquire image forming apparatus information including first information which is available regardless of product manufacturers of the image forming apparatuses, and is configured to perform an exclusion control for setting print conditions based on second information which is specific to each of the image forming apparatuses, said exclusion control for setting print conditions being performed by the image forming apparatuses instead of the management apparatus.

2. The image forming system as claimed in claim 1, wherein the management apparatus includes an information storing unit configured to store the image forming apparatus information and software component information in a predetermined storage area of the storage device, the image forming apparatus information including device identification information for identifying an apparatus and model type identification information for identifying a model type such that the device identification information and the model type identification information are associated with each other, the software component information including software component identification information for identifying a software component and the model type identification information associated with the software component identification information, and wherein the selecting unit is configured to refer to the image forming apparatus information stored by the information storing unit in response to the device identification information corresponding to the printing apparatus specified by the print request to acquire the model type identification information associated with the device identification information, to refer to the software component information stored by the information storing unit in response to the acquired model type identification information to acquire the software component identification information associated with the acquired model type identification information, and to select the software component to be used to generate the print data corresponding to the image forming apparatus selected as a printing apparatus in response to the acquired software component identification information.

3. The image forming system as claimed in claim 2, wherein in a case in which the device identification information is specified as the printing apparatus by the print request, the transmission unit is configured to refer to the image forming apparatus information stored by the information storing unit in response to the specified device identification information to acquire destination information associated with the specified device identification information, the destination information being indicative of a destination of print data transmission, and to transmit the print data generated by the selected software component to the image forming apparatus selected as a printing apparatus through the corresponding communication control apparatus.

4. The image forming system as claimed in claim 2, wherein in a case in which the corresponding communication control apparatus includes a communication device having a global IP address assigned thereto, and the device identification information stored by the information storing unit of the management apparatus for the corresponding communication control apparatus is the global IP address, the transmission unit is configured to transmit the print data generated by the selected software component to the image forming apparatus selected as a printing apparatus through the corresponding communication control apparatus according to the global IP address serving as the apparatus identification information specified as the printing apparatus by the print request.

5. The image forming system as claimed in claim 2, wherein the communication control apparatus includes a device information acquisition unit configured to acquire device information from an apparatus connected through a predetermined interface, and the management apparatus is configured to update the image forming apparatus information stored by the information storing unit based on the device information acquired by the device information acquisition unit of the communication control apparatus.

6. The image forming system as claimed in claim 2, wherein the information storing unit is configured to store user information in a predetermined storage area of the storage device, the user information including user identification information for identifying a user using the image forming system and the device identification information associated with the user identification information, and wherein in a case in which the management apparatus receives the print request transmitted from the information processing apparatus, the management apparatus identifies a user making the print request based on the user information stored by the information storing unit, and presents the device identification information associated with the identified user as a candidate apparatus that is selectable as a printing apparatus.

7. The image forming system as claimed in claim 1, wherein the communication control apparatus includes a transfer unit configured to transfer received data to an apparatus connected through a predetermined interface, and the transfer unit is configured to transfer the print data transmitted from the management apparatus to the image forming apparatus selected as a printing apparatus.

8. A management apparatus for managing and operating an image forming system, which management apparatus receives a print request from an information processing apparatus, and sends an image forming request to an image forming apparatus selected according to the print request as a printing apparatus through a communication control apparatus for controlling data communication between the management apparatus and the image forming apparatus, the image forming request requesting to perform a predetermined image forming operation, the management apparatus comprising:

a software component storing unit configured to store one or more software components in a predetermined storage area of a storage device of the management apparatus, the one or more software components being each configured to generate print data recognizable by a corresponding image forming apparatus;

a selecting unit configured to select a software component from the one or more software components stored in the storage device by the software component storing unit in response to the print request, the selected software component being used to generate print data corresponding to the image forming apparatus selected as a printing apparatus; and a transmission unit configured to transmit the print data generated by the selected software component selected by the selecting unit to the image forming apparatus selected as a printing apparatus through the communication control apparatus, wherein each of the one or more software components is a printer driver of the corresponding image forming apparatus and located only in the management apparatus so that the information processing apparatus does not include the printer driver, and the management apparatus is configured to acquire image forming apparatus information including first information which is available regardless of product manufacturers of the image forming apparatuses, and is configured to perform an exclusion control for setting print conditions based on second information which is specific to each of the image forming apparatuses, said exclusion control for setting the print conditions being performed by the image forming apparatuses instead of the management apparatus.

9. The management apparatus as claimed in claim 8, further comprising an information storing unit configured to store the image forming apparatus information and software component information in a predetermined storage area of the storage device, the image forming apparatus information including device identification information for identifying an apparatus and model type identification information for identifying a model type such that the device identification information and the model type identification information are associated with each other, the software component information including software component identification information for identifying a software component and the model type identification information associated with the software component identification information, wherein the selecting unit is configured to refer to the image forming apparatus information stored by the information storing unit in response to the device identification information corresponding to the printing apparatus specified by the print request to acquire the model type identification information associated with the device identification information, to refer to the software component information stored by the information storing unit in response to the acquired model type identification information to acquire the software component identification information associated with the acquired model type identification information, and to select the software component to be used to generate the print data corresponding to the image forming apparatus selected as a printing apparatus in response to the acquired software component identification information.

10. The management apparatus as claimed in claim 9, wherein in a case in which the device identification information is specified as the printing apparatus by the print request, the transmission unit is configured to refer to the image forming apparatus information stored by the information storing unit in response to the specified device identification information to acquire destination information associated with the specified device identification information, the destination information being indicative of a destination of print data transmission, and to transmit the print data generated by the selected software component to the image forming apparatus selected as a printing apparatus through the communication control apparatus.

11. The management apparatus as claimed in claim 9, wherein in a case in which the communication control apparatus includes a communication device having a global IP address assigned thereto, and the device identification information stored by the information storing unit for the communication control apparatus is the global IP address, the transmission unit is configured to transmit the print data generated by the selected software component to the image forming apparatus selected as a printing apparatus through the communication control apparatus according to the global IP address serving as the apparatus identification information specified as the printing apparatus by the print request.

12. The management apparatus as claimed in claim 9, wherein the communication control apparatus includes a device information acquisition unit configured to acquire device information from an apparatus connected through a predetermined interface, and the image forming apparatus information stored by the information storing unit is updated based on the device information acquired by the device information acquisition unit of the communication control apparatus.

13. The management apparatus as claimed in claim 9, wherein the information storing unit is configured to store user information in a predetermined storage area of the storage device, the user information including user identification information for identifying a user using the image forming system and the device identification information associated with the user identification information, and wherein in a case in which the management apparatus receives the print request transmitted from the information processing apparatus, a user making the print request is identified based on the user information stored by the information storing unit, and the device identification information associated with the identified user is presented as a candidate apparatus that is selectable as a printing apparatus.

14. A non-transitory machine-readable recording medium having an image forming program embodied therein for causing a management apparatus to manage and operate an image forming system, which management apparatus receives a print request from an information processing apparatus, and sends an image forming request to an image forming apparatus selected according to the print request as a printing apparatus through a communication control apparatus for controlling data communication between the management apparatus and the image forming apparatus, the image forming request requesting to perform a predetermined image forming operation, the image forming program causing a computer to function as:

a software component storing unit configured to store one or more software components in a predetermined storage area of a storage device of the management apparatus, the one or more software components being each configured to generate print data recognizable by a corresponding image forming apparatus;

a selecting unit configured to select a software component from the one or more software components stored in the storage device by the software component storing unit in response to the print request, the selected software component being used to generate print data corresponding to the image forming apparatus selected as a printing apparatus; and a transmission unit configured to transmit the print data generated by the selected software component selected by the selecting unit to the image forming apparatus selected as a printing apparatus through the communication control apparatus, and wherein each of the one or more software components is a printer driver of the corresponding image forming apparatus and located only in the management apparatus so that the information processing apparatus does not include the printer driver, and the image forming program further causes the computer to acquire image forming apparatus information including first information which is available regardless of product manufacturers of the image forming apparatuses, and is configured to perform an exclusion control for setting print conditions based on second information which is specific to each of the image forming apparatuses, said exclusion control for setting print conditions being performed by the image forming apparatuses instead of the management apparatus.

15. The image forming system as claimed in claim 1, wherein the second information includes operation conditions of available functions of each of the image forming apparatuses.

* * * * *